(12) United States Patent
Allen

(10) Patent No.: US 12,330,736 B1
(45) Date of Patent: Jun. 17, 2025

(54) SINGLE WHEELED VEHICLE WITH INCREASED TRAVEL RANGE

(71) Applicant: Float Supply, LLC, Sacramento, CA (US)

(72) Inventor: Robert Allen, Sacramento, CA (US)

(73) Assignee: Float Supply, LLC, Sacramento, CA (US)

(*) Notice: Subject to any disclaimer, the term of this patent is extended or adjusted under 35 U.S.C. 154(b) by 0 days.

(21) Appl. No.: 18/965,560

(22) Filed: Dec. 2, 2024

Related U.S. Application Data

(63) Continuation of application No. 18/913,763, filed on Oct. 11, 2024, now abandoned.

(51) Int. Cl.
 *B62K 1/00* (2006.01)
(52) U.S. Cl.
 CPC ............ *B62K 1/00* (2013.01); *B62K 2202/00* (2013.01)
(58) Field of Classification Search
 CPC ... B62K 1/00; B62K 2202/00; B62K 2204/00
 See application file for complete search history.

(56) References Cited

U.S. PATENT DOCUMENTS

| 9,598,141 | B1 | 3/2017 | Doerksen et al. | |
|---|---|---|---|---|
| 2011/0000724 | A1* | 1/2011 | Heinen | B62D 5/0418 180/65.51 |
| 2017/0361900 | A1* | 12/2017 | Doerksen | B60K 7/0007 |

OTHER PUBLICATIONS

VOW Systems, "Fusion Care" © 2024, VOW Systems.
VOW, "The Fusion Core" https://www.youtube.com/watch?v=fh3Mfup2IYo, visited site on Oct. 17, 2024.

* cited by examiner

*Primary Examiner* — Jason D Shanske
*Assistant Examiner* — Matthew James O'Neill
(74) *Attorney, Agent, or Firm* — Renner, Otto, Boisselle & Sklar, LLP

(57) ABSTRACT

A hub motor for a single-wheel electric vehicle. The motor includes an outer rotor which encloses a stator that in turn encloses an interior chamber within the hub motor that may be used to hold an electronic controller. One or more end caps may suspend a mounting board within the interior chamber, and the exterior of the one or more end caps connects the apparatus to the electric vehicle's chassis. The additional capacity provided by the interior chamber allows the electric vehicle to hold more battery capacity, thereby extending the range of the electric vehicle between recharges.

30 Claims, 21 Drawing Sheets

SINGLE WHEELED VEHICLE WITH INCREASED TRAVEL RANGE

TECHNICAL FIELD

This application is a Continuation and claims priority to U.S. application Ser. No. 18/913,763 filed Oct. 11, 2024, which is hereby incorporated herein by reference in its entirety.

BACKGROUND OF THE ART

Single-wheel electric vehicles (henceforth referred to as a "vehicle") are often used for personal transportation because they are portable and easy to operate. These prior art vehicles often take the form of a board that surrounds the vehicle's single wheel. The board often has footpad sensors on its surface, and contains batteries and electronic controllers within the deck. The vehicle's single wheel contains a hub motor that in turn surrounds an axle that connects the single wheel to the board. U.S. Pat. No. 9,598,141 B1 provides an example of this type of prior art single wheeled vehicle.

A significant limitation of prior art vehicles, however, is that the vehicle's travel range is limited by the vehicle's battery capacity. While battery capacity can be increased via the inclusion of additional batteries, this addition of batteries is often impossible because significant portions of the board's interior space are occupied by other vehicle components like the vehicle's electronic controller.

Another problem with prior art vehicles is that the vehicle's electronic controller is located in the front of the vehicle, making it susceptible to damage from impacts.

SUMMARY

A hub motor may be used to drive a single-wheel electric vehicle. The motor includes an outer rotor which encloses a stator that in turn encloses an interior chamber within the hub motor. The interior chamber may be used to hold an electronic controller that would otherwise reside elsewhere in the vehicle. One or more end caps may suspend within the interior chamber a mounting board that holds the electronic controller. The exterior of the one or more end caps may also connect the hub motor to the electric vehicle's chassis. The additional storage capacity provided by the interior chamber allows the electric vehicle to hold additional battery capacity in the vehicle's other interior spaces that would otherwise be devoted to holding the vehicle's electronic controller. This additional battery capacity provides the advantage of extending the range of the electric vehicle between recharges.

According to an aspect of the disclosure, the apparatus is an electric vehicle that includes a board frame including a chassis, a first deck portion, and a second deck portion. The chassis supports the first deck portion and the second deck portion, with each of the deck portions configured to receive a left or right foot of a rider oriented generally perpendicular to a direction of travel of the electric vehicle. A rotatable ground-contacting wheel is disposed between the first deck portion and the second deck portion, wherein the wheel extends above and below the first deck portion and the second deck portion. The hub motor is contained within the rotatable ground-contacting wheel and is configured to rotate the ground-contacting wheel to propel the electric vehicle, wherein the ground-contacting wheel encircles the rotor and wherein the chassis connects to the hub motor frame mounts. An electronic controller is contained within the interior chamber to control the hub motor.

According to an aspect of the disclosure, the apparatus is an electric vehicle with a hub motor wherein a rotor surrounds a stator, and the stator contains a hollow center cavity. An inner sleeve is located inside the hollow center cavity, wherein the inner sleeve has a body, a first end, and a second end which collectively form an interior chamber. A first end cap is attached to the first end of the inner sleeve, and a second end cap is attached to the second end of the inner sleeve. The first end cap and second end cap include respective frame mounts.

According to an aspect of the disclosure, the apparatus is an electric vehicle with a hub motor wherein a rotor surrounds a stator, and the stator contains a hollow center cavity. An inner sleeve is located inside the hollow center cavity, wherein the inner sleeve has a body, a first end, and a second end which collectively form an interior chamber. A first end cap that is attached to the first end of the inner sleeve, and a second end cap that is attached to the second end of the inner sleeve. The first end cap and second end cap include respective frame mounts. A mounting board is located within the inner chamber, wherein the mounting board connects to at least one of the first end cap or second end cap and, in some embodiments, the mounting board does not contact the inner sleeve. An electronic controller is attached to the mounting board and configured to operate the motor by sending power to the stator. Power wires are included to bring power from the battery to the electronic controller. Signal wires are included to communicate signals from one or more sensors to the electronic controller. Control wires are included to send power from the electronic controller to the stator to control the hub motor.

According to an aspect of the disclosure, the apparatus includes a mounting board that is solely suspended and supported from the first end cap and the second end cap.

According to an aspect of the disclosure, the apparatus includes an inner sleeve body with an access hole, and wherein a control wire passes through the access hole.

According to an aspect of the disclosure, the apparatus includes a power wire that passes through a port in the first or second end cap.

According to an aspect of the disclosure, the apparatus includes an electronic controller which connects to the power wire and the control wire via releasable connectors.

According to an aspect of the disclosure, the apparatus includes an inner sleeve that has an interior surface and that includes a thermally insulative material.

According to an aspect of the disclosure, the apparatus includes a heat sink affixed to or integral with the first end cap or second end cap.

According to an aspect of the disclosure, the apparatus includes a first end cap and a second end cap which each include a seal, wherein the first end cap is engaged on the respective first end of the inner sleeve and the and second end cap is engaged on the respective second end of the inner sleeve to make the inner chamber watertight.

According to an aspect of the disclosure, the apparatus includes a stator and the inner sleeve that are connected via a friction fit.

According to an aspect of the disclosure, the apparatus includes a rotor, an inner sleeve, and a stator that each have respective lengths, and the lengths of both the rotor and the inner sleeve are greater than the length of the stator.

According to an aspect of the disclosure, the apparatus includes a stator that has a first end and a second end; wherein a first bearing is in line with the first end of the stator, and a second bearing is in line with the second end of the stator. In this aspect of the apparatus, both the first bearing and the second bearing are located between the inner sleeve and the rotor.

According to an aspect of the disclosure, the apparatus includes frame mounts that are axle shafts.

According to an aspect of the disclosure, the apparatus includes hub motor frame mounts that are bolts that thread into threaded holes in the first end cap and the second end cap, which may be used to facilitate mounting to the chassis.

According to an aspect of the disclosure, the apparatus includes an end cap that contains a charging port that may be connected to the battery via a battery wire. The first or second end cap also contains a control interface configured to turn on the electronic controller.

According to an aspect of the disclosure, the apparatus includes an inflatable tire as the ground-contacting wheel, and the rotor forms a tire rim that supports said tire.

According to an aspect of the disclosure, the apparatus includes a first end cap and a second end cap that both sit flush with the chassis. The first end cap and the second end cap bolt directly to the chassis so that no air gaps exist between the chassis and the first end cap, and no air gaps exist between the chassis and the second end cap.

According to an aspect of the disclosure, the apparatus includes an axle that extends from the first or second end cap and connects with the chassis.

According to an aspect of the disclosure, the apparatus is an electric vehicle that includes a board frame including a chassis, a first deck portion, and a second deck portion. The chassis supports the first deck portion and the second deck portion, with each of the deck portions configured to receive a left or right foot of a rider oriented generally perpendicular to a direction of travel of the electric vehicle. A rotatable ground-contacting wheel is disposed between the first deck portion and the second deck portion, wherein the wheel extends above and below the first deck portion and the second deck portion. A hub motor is contained within the rotatable ground-contacting wheel and is configured to rotate the ground-contacting wheel to propel the electric vehicle, wherein the ground-contacting wheel encircles the rotor and wherein the chassis connects to the hub motor frame mounts. The hub motor includes a rotor, a stator disposed within the rotor, the stator having formed a hollow center cavity with a first cavity end and a second cavity end. A first end cap covers the first cavity end, and a second end cap covers the second cavity end. Each of the first cavity end cap and the second cavity end cap include respective frame mounts. An electronic controller is contained within the hollow center cavity chamber, wherein the electronic controller is configured to operate the hub motor by sending power to the stator.

According to an aspect of the disclosure, the apparatus is an electric vehicle that includes a mounting board that is located within the hollow center cavity and connects to at least one of the first or second end caps. A power wire connects a battery to the electronic controller, a signal wire communicates signals between one or more sensors and the electronic controller, and a control wire controls the stator by sending power from the electronic controller to the stator. The electronic controller is attached to the mounting board.

According to an aspect of the disclosure, the apparatus is a hub motor that includes a rotor that surrounds a stator, the stator having formed a hollow center cavity with a first cavity end and a second cavity end. A first end cap covers the first cavity end, and a second end cap covers the second cavity end, wherein the first cavity end cap and the second cavity end cap include respective frame mounts. An electronic controller is contained within the hollow center cavity, wherein the electronic controller is configured to operate the hub motor by controlling power to the stator.

According to an aspect of the disclosure, the apparatus is a hub motor that includes an inner sleeve that is located inside the hollow center cavity, wherein the inner sleeve has a body, a first end, and a second end, that form an interior chamber. A first end cap is attached to the first end of the inner sleeve, and a second end cap is attached to the second end of the inner sleeve, and the first end cap and the second end cap include respective frame mounts. The electronic controller is contained within the interior chamber of the hub motor.

According to an aspect of the disclosure, the apparatus is a hub motor that includes a mounting board located within the interior chamber, wherein the mounting board connects to at least one of the first end cap or second end cap. An electronic controller attached to the mounting board and configured to operate the motor by sending power to the stator. A power wire connects a battery to the electronic controller, a signal wire communicates signals between one or more sensors and the electronic controller, and a control wire controls the stator by sending power from the electronic controller to the stator. The electronic controller is attached to the mounting board.

According to an aspect of the disclosure, the apparatus is a hub motor that includes a rotor that surrounds a stator, wherein the stator contains a hollow center cavity. An inner sleeve is located inside the hollow center cavity, wherein the inner sleeve has a body, a first end, and a second end, which collectively form an interior chamber. A first end cap is attached to the first end of the inner sleeve, and a second end cap is attached to the second end of the inner sleeve, wherein the first end cap and the second end cap include respective frame mounts. A mounting board is located within the inner chamber, wherein the mounting board connects to at least one of the first end cap or second end cap and the mounting board does not contact the inner sleeve. An electronic controller is attached o the mounting board and is configured to send power to the hub motor stator.

According to an embodiment of the apparatus, the first end of the inner sleeve is open and the second end of the inner sleeve is sealed closed. An end cap covers the open end of the inner sleeve, and frame mounts are affixed to and included in the sealed second end of the inner sleeve.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

The disclosed apparatus is an improved hub motor that enhances the battery holding capacity of single-wheeled vehicles. The apparatus accomplishes this increase in battery capacity by providing space within an interior chamber of the hub motor. This additional space can hold the vehicle's electronic controller, thereby freeing up the space where the controller would otherwise reside in the vehicle for more battery storage.

Figure 1:
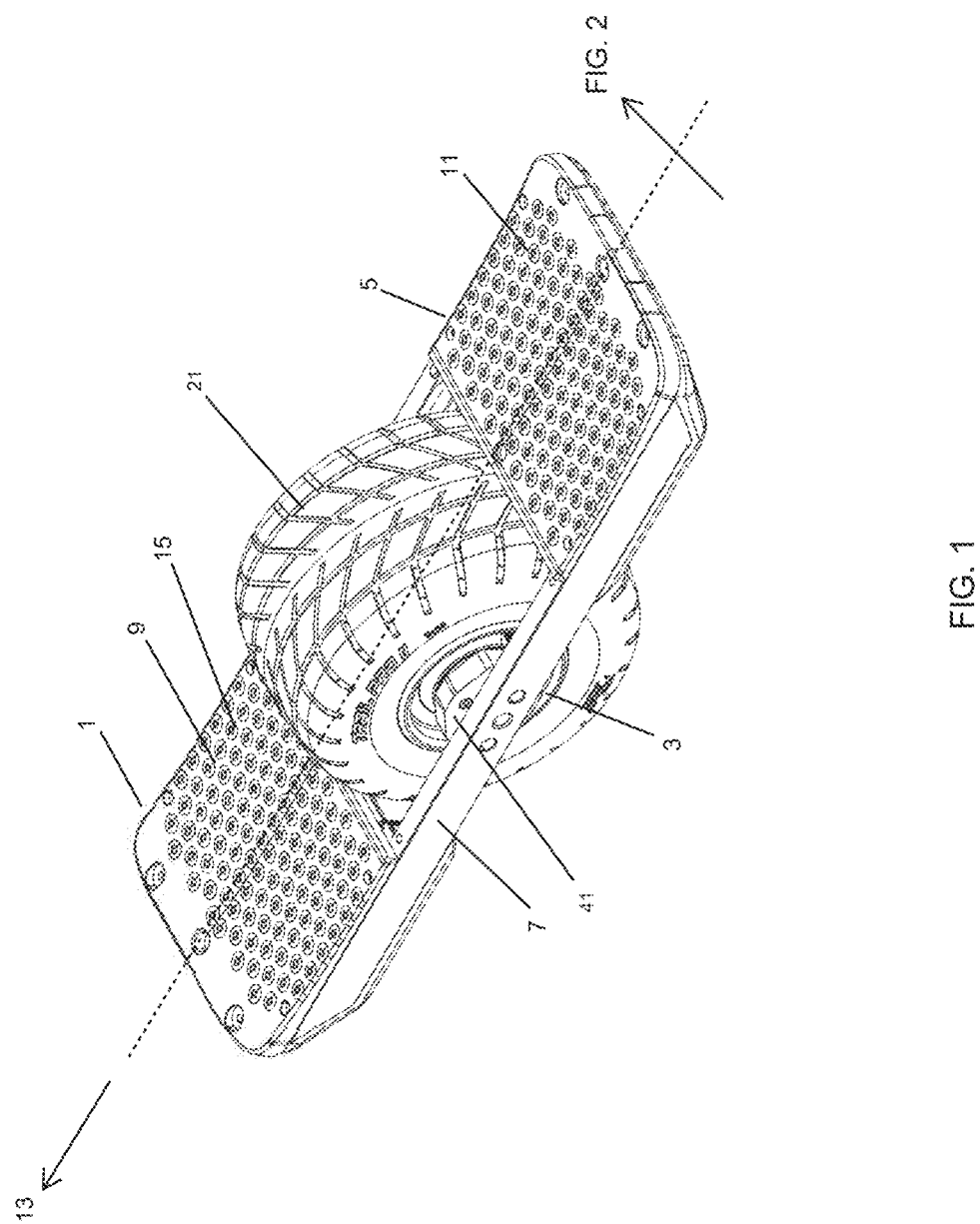
FIG. 1 is a front-right side elevational view of the embodiment of the hub motor inserted into an electric vehicle with a board frame and wheel.

With respect to the drawings, and in particular to FIG. 1, in one embodiment of the apparatus, the vehicle 1 includes a hub motor 3 attached to a board frame 5 that includes a chassis 7 that supports a first deck portion 9 and a second deck portion 11. Each of the first deck portion 9 and the second deck portion 11 are configured to receive a left or right foot of a rider oriented generally perpendicular to a direction of travel 13 of the electric vehicle 1.

Figure 2:
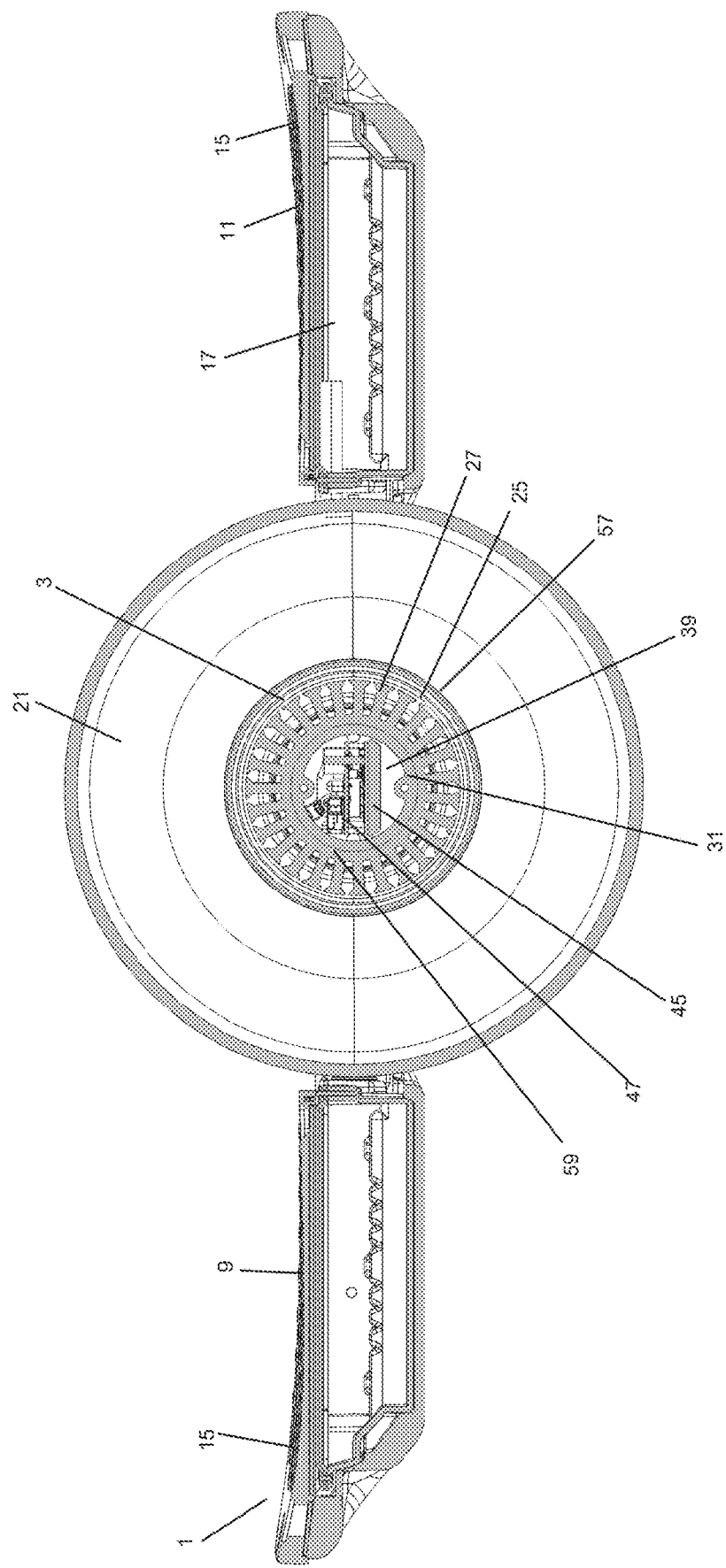
FIG. 2 is a cross-sectional view of the embodiment of FIG. 1.

With regard to FIG. 2, the first deck portion 9 and second deck portion 11 may each include a sensor 15 that detects the presence of a rider's foot, the amount of pressure a rider puts on the deck portion, the direction of pressure exerted on the deck portion by the user, or the angle of the deck relative to the surface the vehicle 1 is upon. Each deck portion 9, 11 may include an interior compartment 17 wherein batteries 19, wires, and circuitry are contained. While additional electronic controllers 47 or processors may be located within the deck portions 9, 11, it is preferable for all electronic controllers 47 or processors to be completely contained within the hub motor 3. This complete containment of the electronic controller 47 within the hub motor 3 allows the batteries to solely occupy the deck portions and increase the operating range of the electric vehicle 1.

Figure 3:
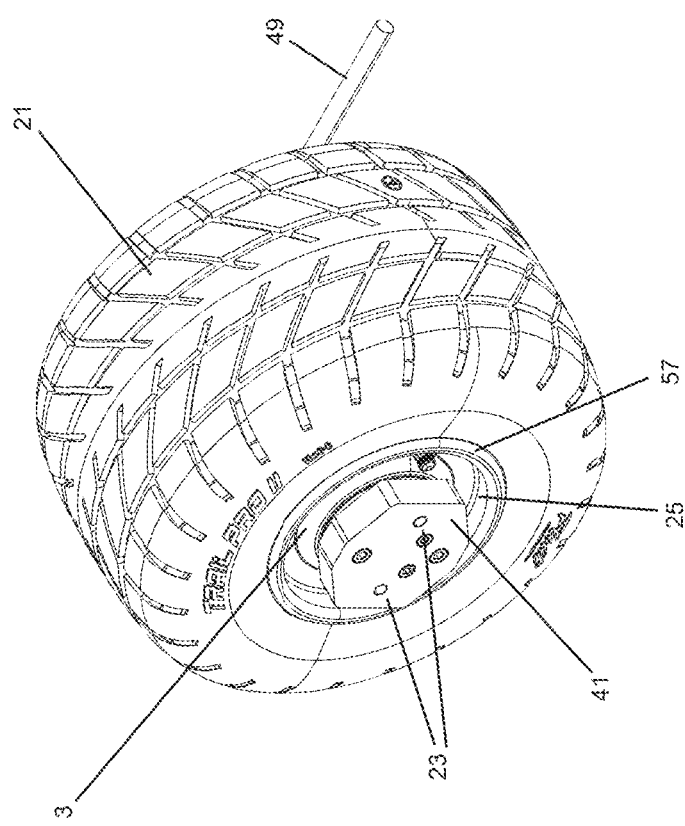
FIG. 3 is a front-right side elevational view of one embodiment of the disclosed motor attached to a tire.
Figure 4:
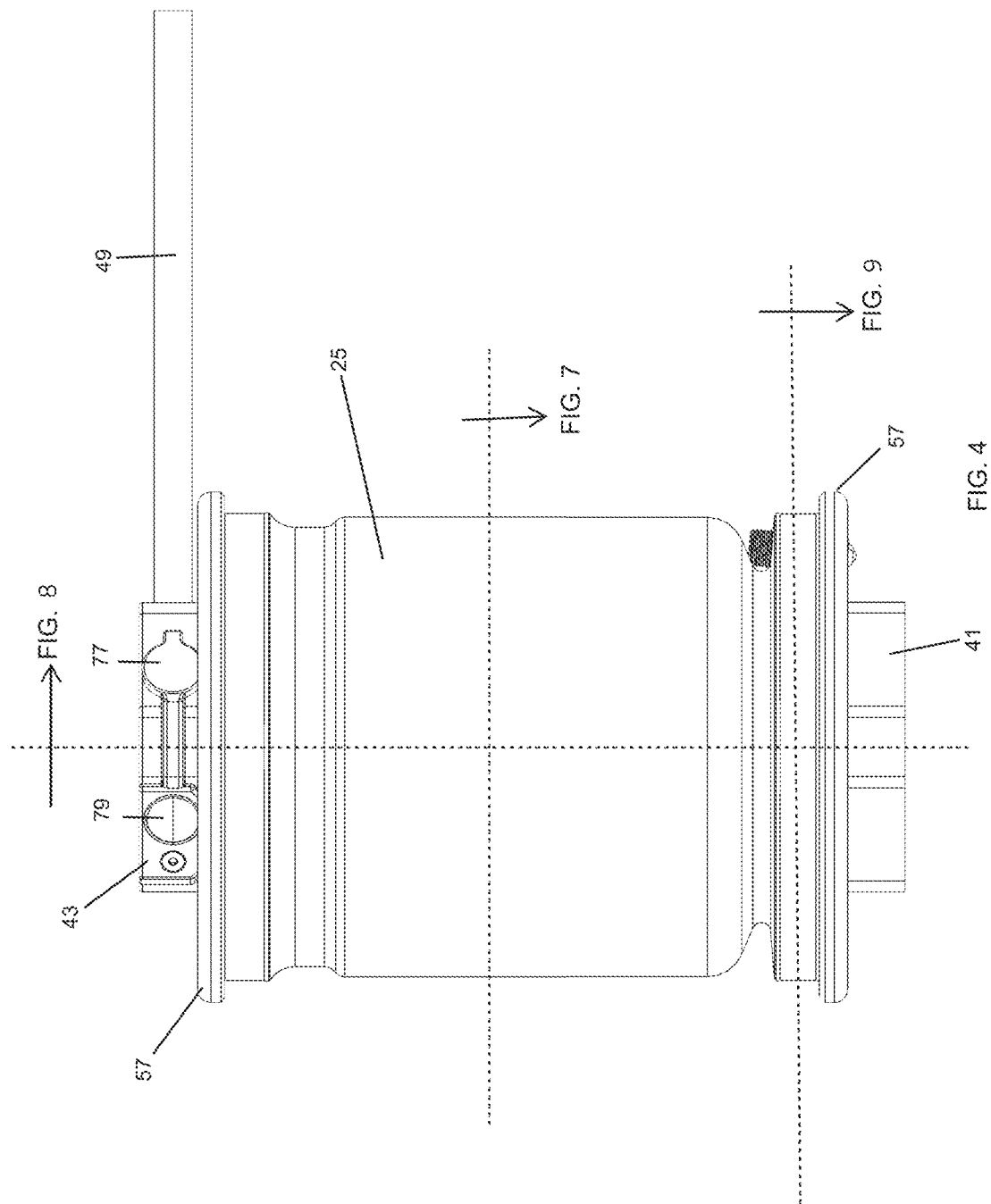
FIG. 4 is a top view of one embodiment of the disclosed motor.
Figure 5:
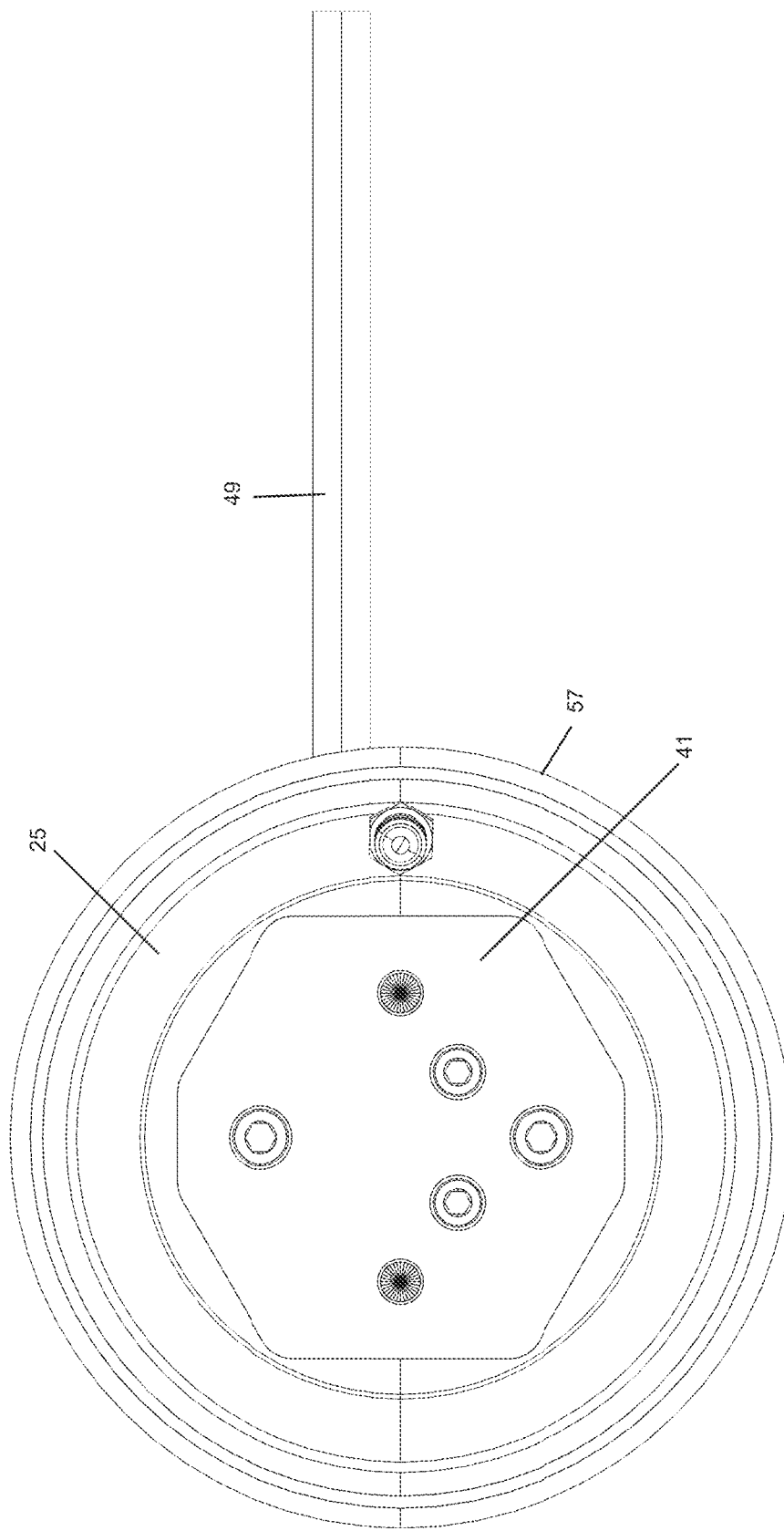
FIG. 5 is a left-side view of one embodiment of the disclosed motor.
Figure 6:
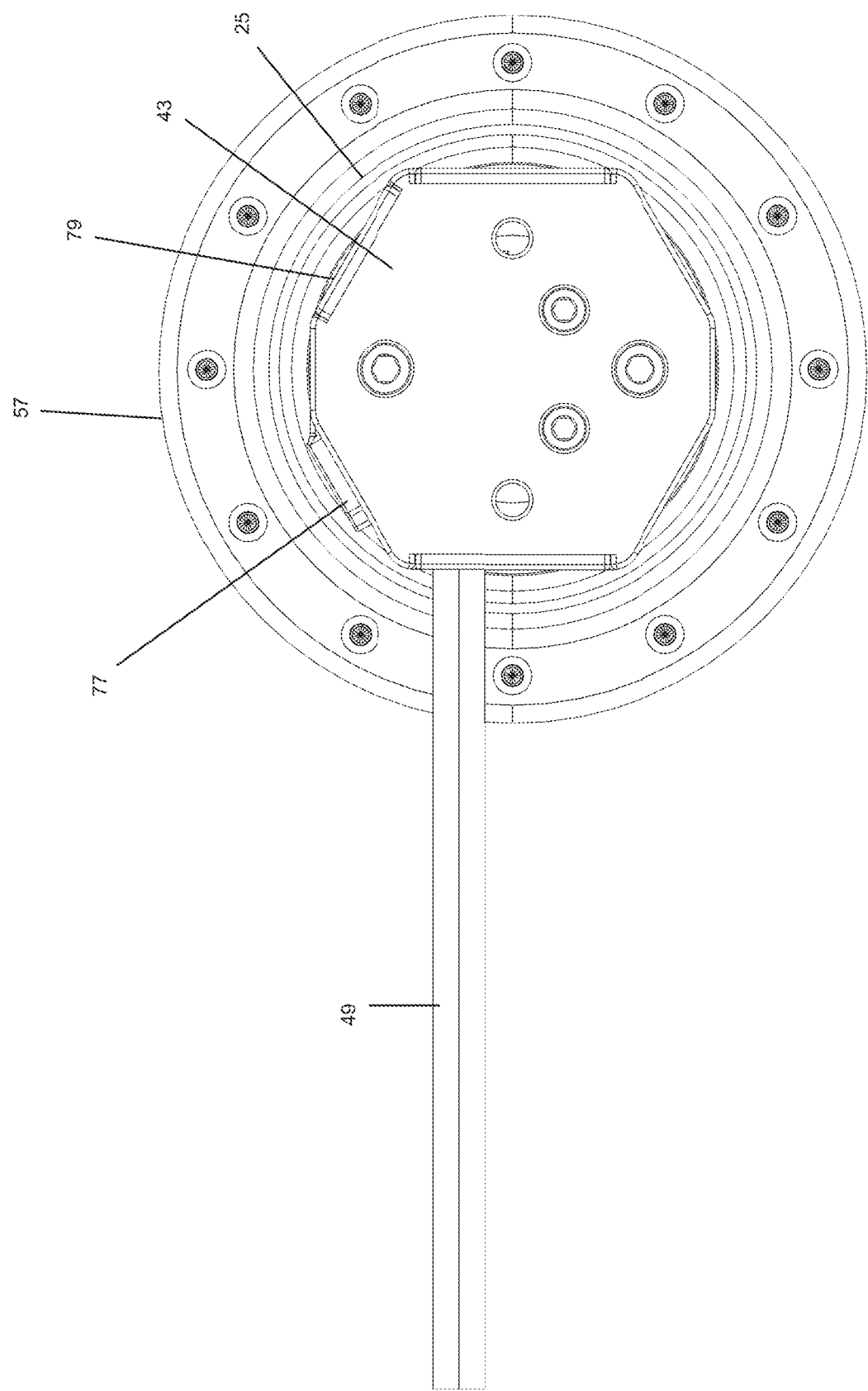
FIG. 6 is a right-side view of one embodiment of the disclosed motor.

With respect to FIGS. 1, 3, and 4, a rotatable ground-contacting wheel 21 encircles the hub motor 3. The hub motor 3 and wheel 21 combination may be disposed between the first deck portion 9 and the second deck portion 11, and extends above and below the first deck portion 9 and the second deck portion 11. The hub motor 3 may include end caps 41, 43. Frame mounts 23 on the end caps 41, 43 may attach directly to the chassis 7 of the electric vehicle 1. This attachment between the frame mounts 23 and chassis 7 may be permanent or removeable.

In a preferred embodiment of the apparatus, the frame mounts 23 sit flush against the chassis 7 with no gaps between the frame mount 23 and chassis 7. Frame mount bolts are then used to removable attach the frame mounts 23 to the chassis 7.

In an alternative embodiment, the frame mounts 23 on the hub motor 3 take the form of axle hub shafts that extend from the end caps of the hub motor 3 and connect with the chassis 7.

With reference FIGS. 4-9, in one embodiment the claimed apparatus's hub motor 3 includes a rotor 25 that surrounds a stator 27. The stator 27 has a hollow center cavity 59, into which an inner sleeve 31 is inserted. The inner sleeve 31 has a body with a first end and a second end that collectively form an interior chamber 39. A first end cap 41 attaches to or engages to the first end of the inner sleeve 31 and a second end cap 43 attaches to or engages to the second end of the inner sleeve 31. In one embodiment, the sleeve 31 and the end cap 41 are one component and only the end cap 43 is removable. In the illustrated embodiment, both end caps 41 and 43 are removable from the sleeve 31.

A mounting board 45 may be located within the interior chamber 39 of the inner sleeve 31, and may connect to at least one of the first end cap 41 or the second end cap 43. An electronic controller 47 may be reside on the mounting board 45. This way, the electronic controller 47 may be located within the interior chamber 39. The electronic controller 47 may be configured to operate the hub motor 3 by controlling power to the stator 27 via a control wire 51. A power wire 49 may be used to bring power from the battery to the electronic controller 47. A signal wire may be used to communicate signals from one or more sensors to the electronic controller 47, and the control wire 51 may be used to control the motor 3 by sending power from the electronic controller 47 to the stator 27.

The sensors connected to the signal wire may include, but are not limited to: gyroscopic sensors used to detect the orientation of the vehicle 1 relative to the ground upon which the vehicle 1 rests; temperature sensors which measure the temperature of the hub motor 3 or the hub motors' internal components (including the temperature inside the internal chamber or the temperature of the electronic controller); rotation sensors that measure the rate of the stator's rotation; pressure sensors on the vehicle's footpads; and battery strength sensors that measure the battery life of the vehicle's battery. The sensors may be located within the motor 3, within the motor's center cavity 59, within the motor's internal chamber 31, within the vehicle's chassis 7 or deck portions 9, 11.

Figure 7:
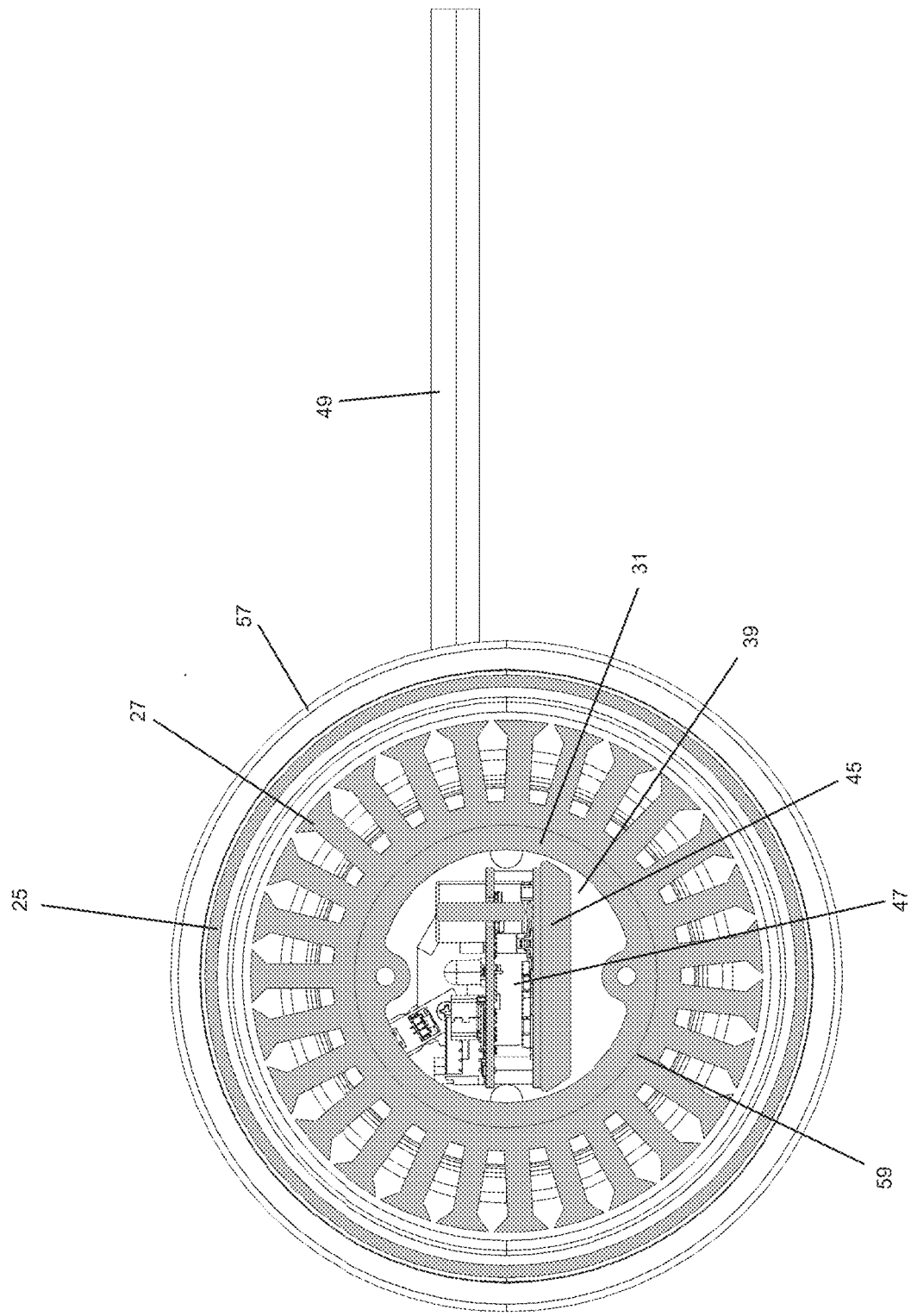
FIG. 7 is a left-side bisecting cross-sectional view of the embodiment shown in FIG. 4.
Figure 8:
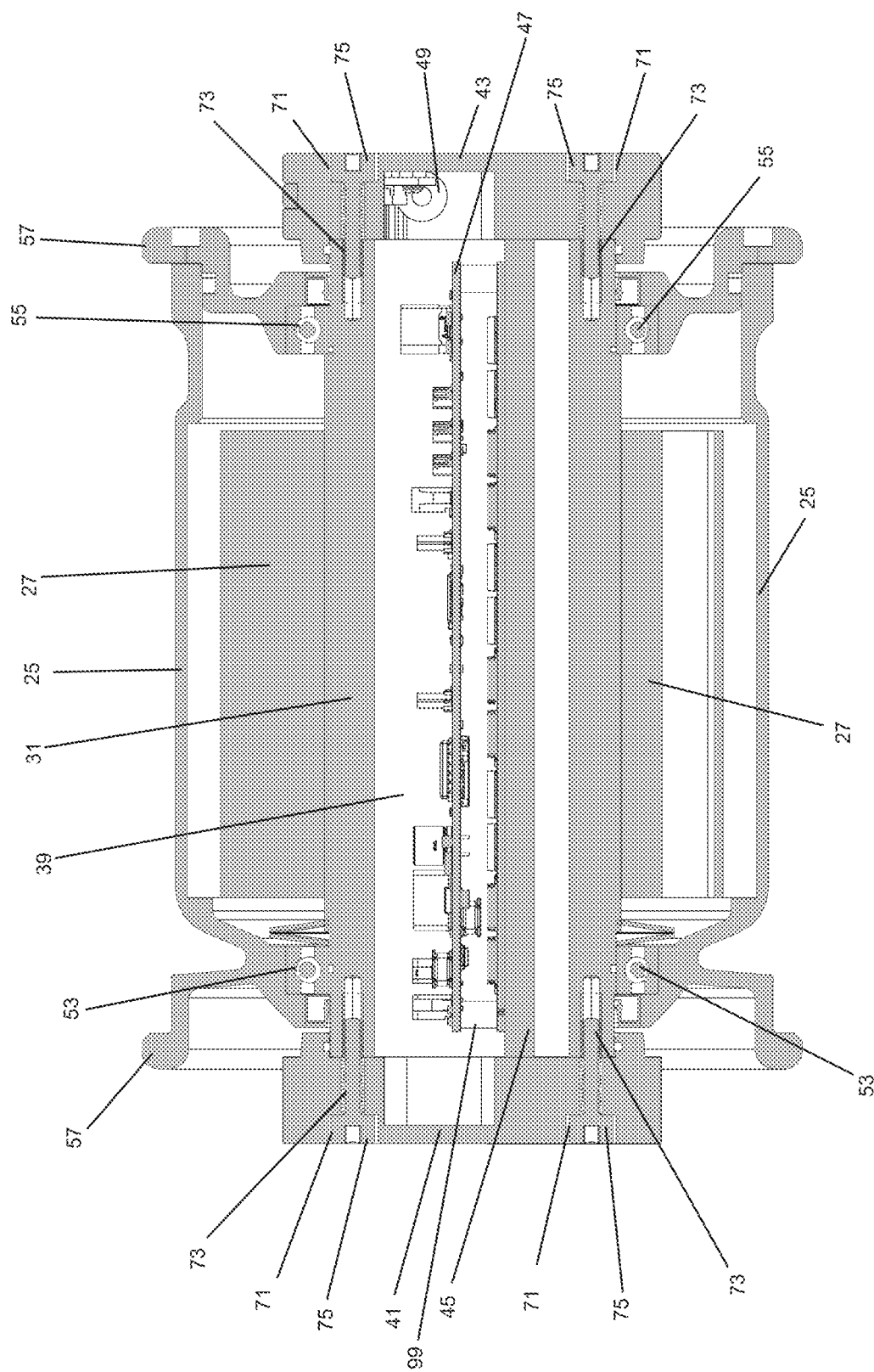
FIG. 8 is a front-side bisecting cross-sectional view of the embodiment shown in FIG. 4.
Figure 9:
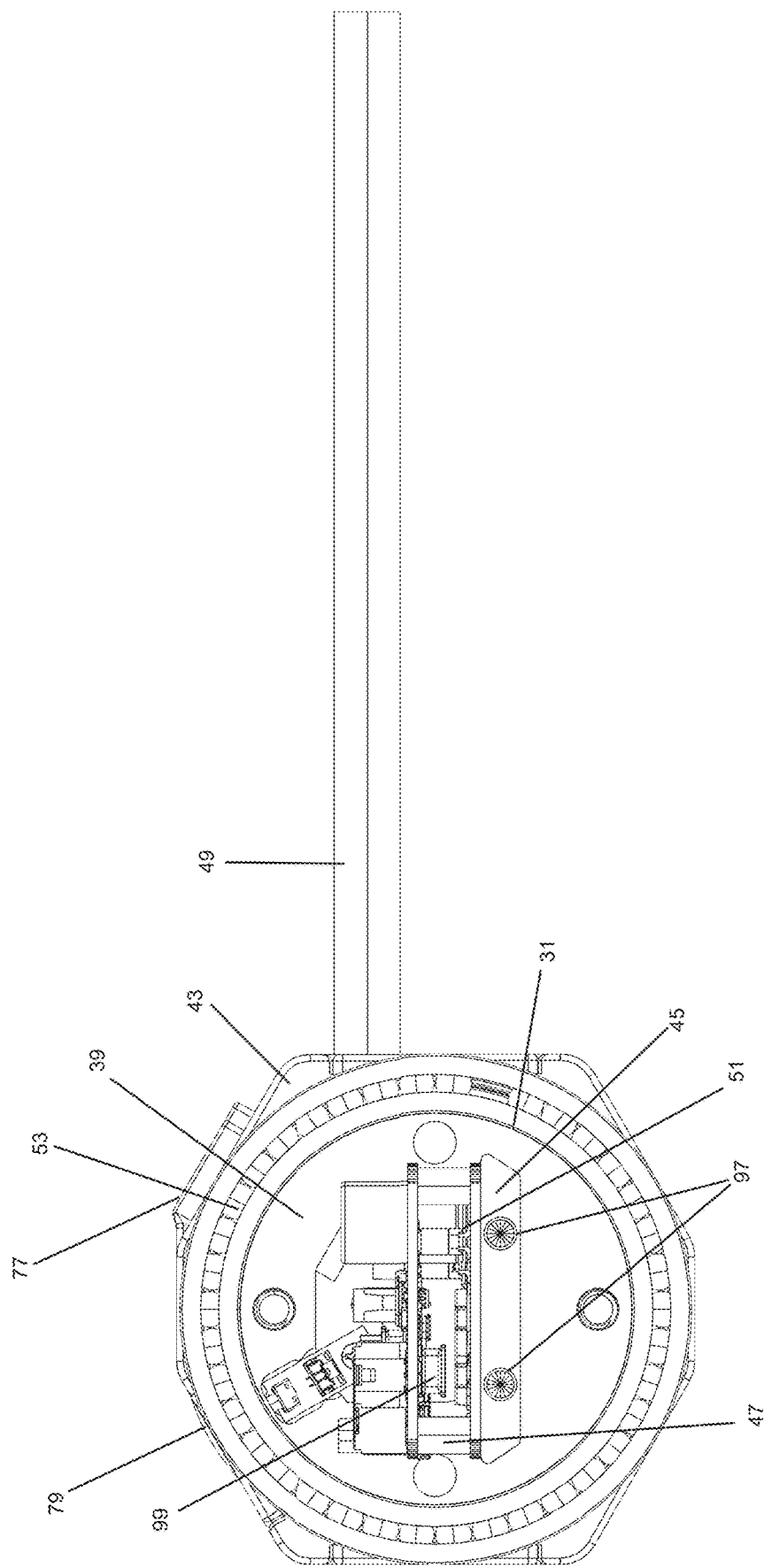
FIG. 9 is a left-side cross-sectional view of the embodiment shown in FIG. 4.
Figure 10:
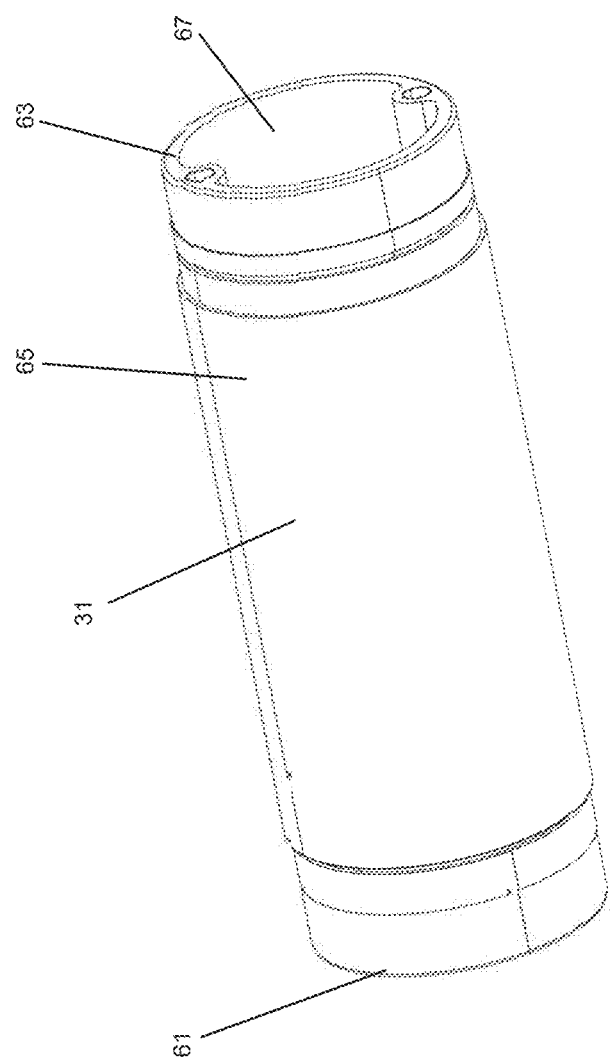
FIG. 10 is a bottom-right perspective view of the inner sleeve in one embodiment of the disclosed motor.
Figure 11:
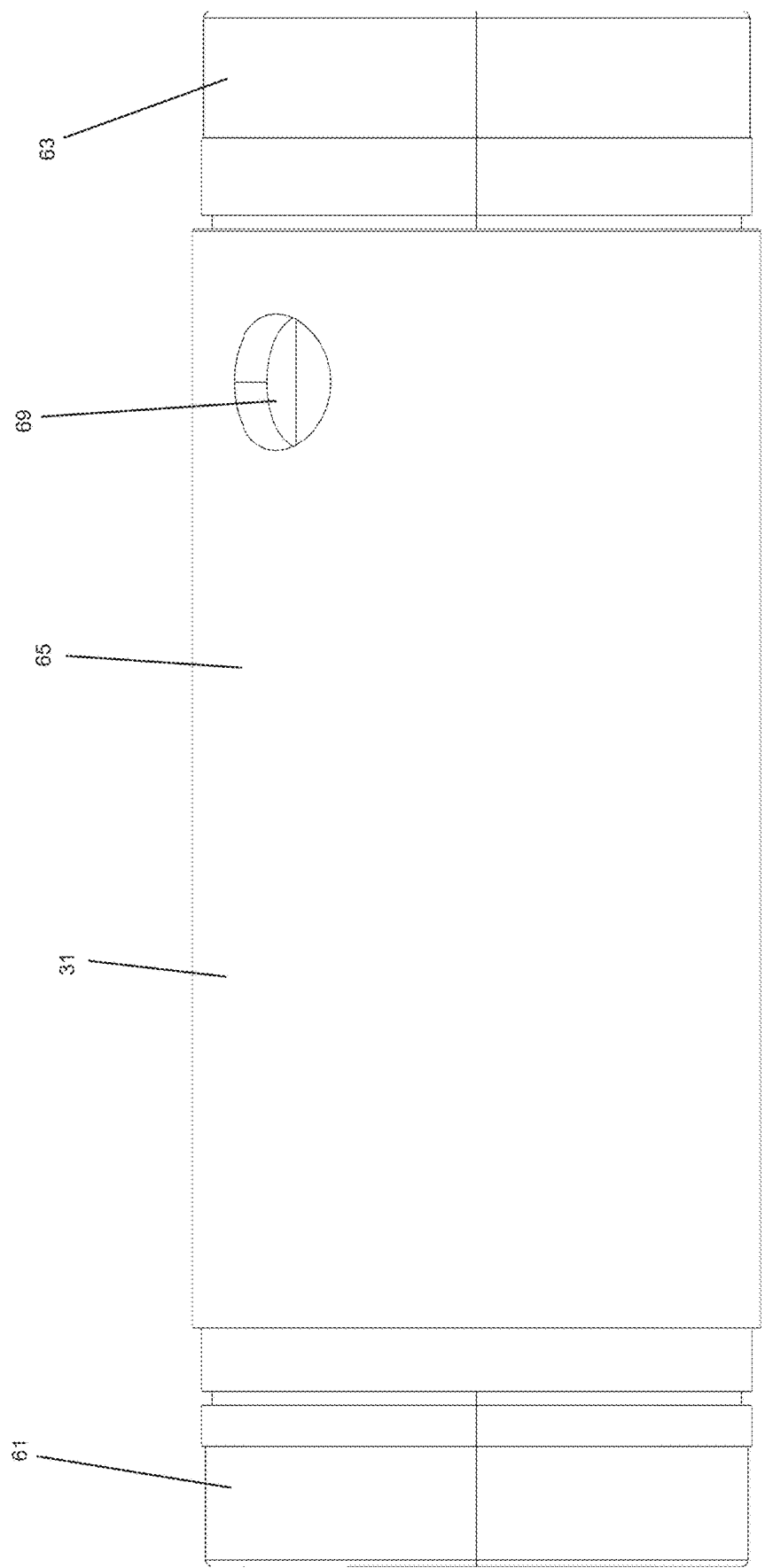
FIG. 11 is a front-side view of the inner sleeve in one embodiment of the disclosed motor.
Figure 12:
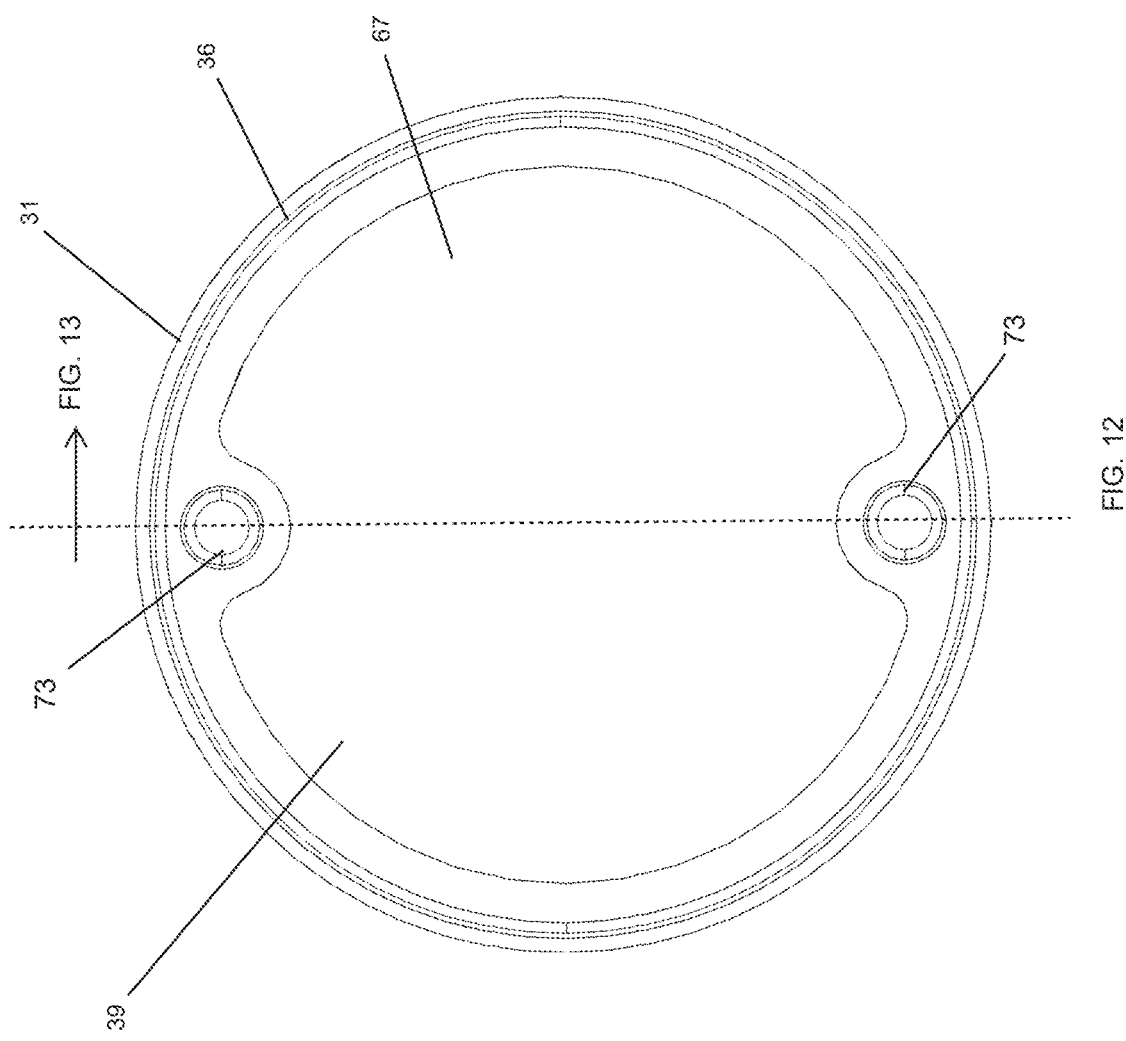
FIG. 12 is a left-side view of the inner sleeve in one embodiment of the disclosed motor.
Figure 13:
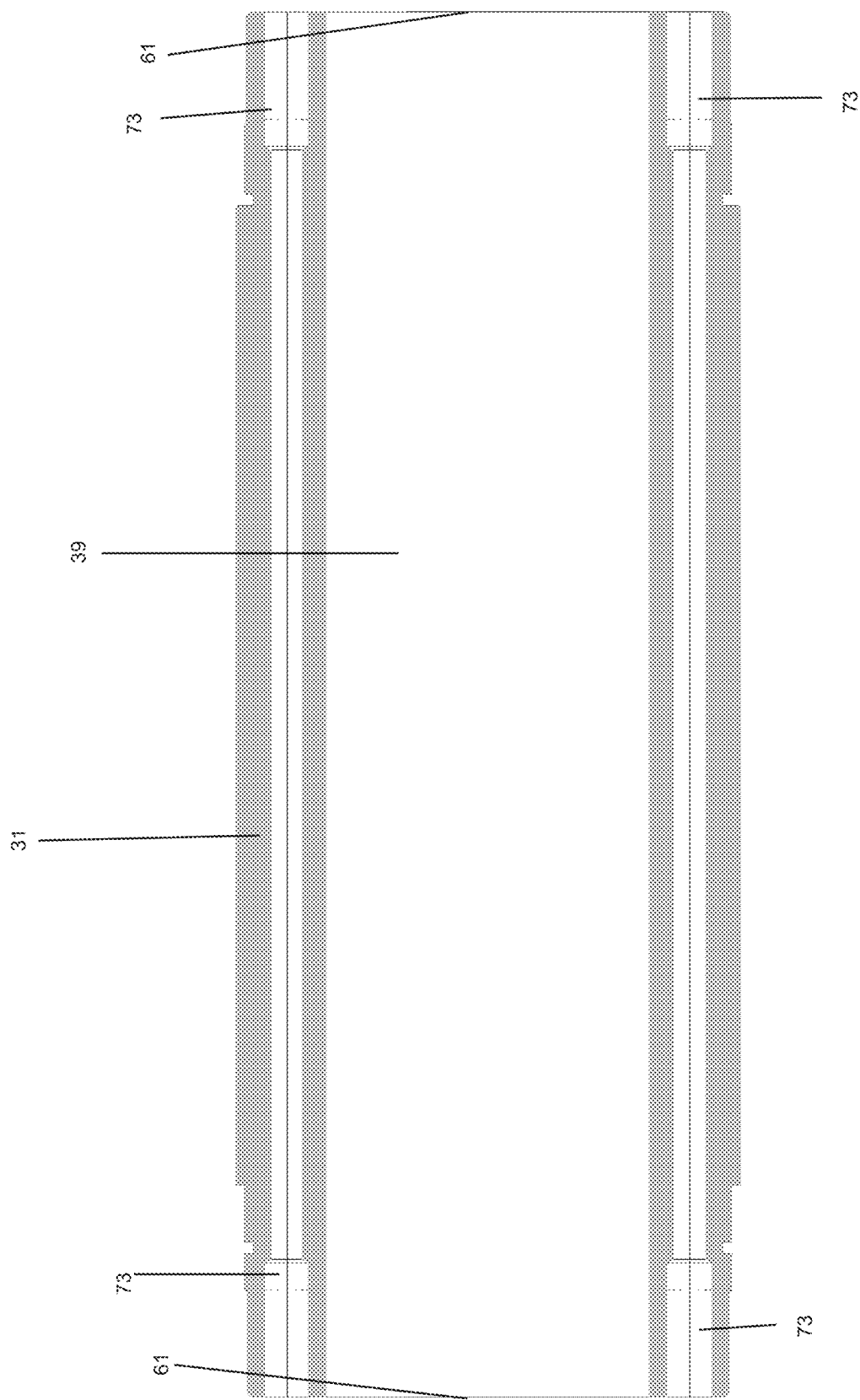
FIG. 13 is a is a front-side bisecting cross-sectional view of embodiment shown in FIG. 12.
Figure 14:
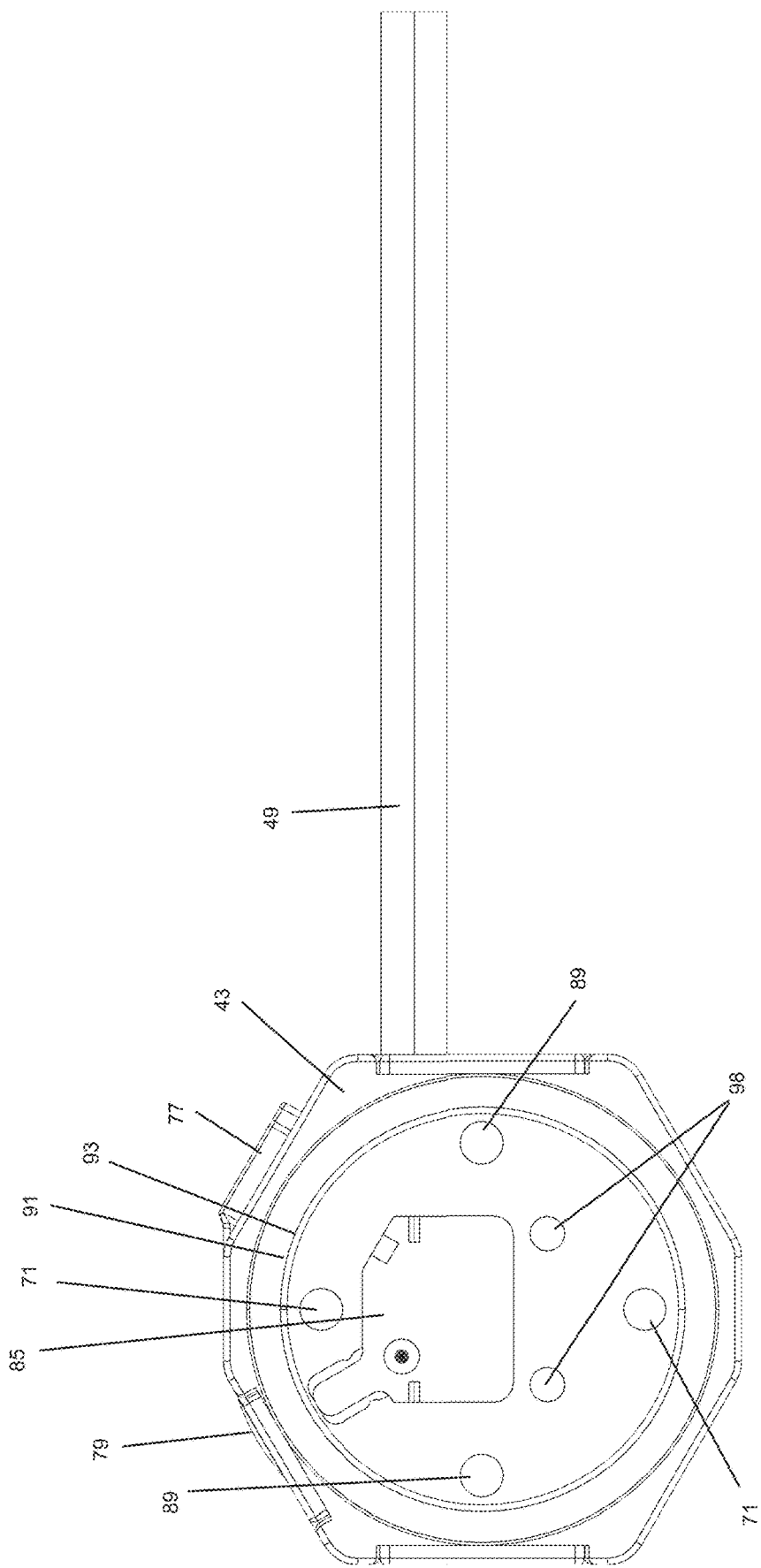
FIG. 14 is a left-side view of a first end cap showing the interior chamber facing side of the end cap in one embodiment of the disclosed motor.

With reference to FIGS. 7-9, in one embodiment the rotor 25 of the hub motor 3 has a cylindrical shape that surrounds the motor's stator 27. The rotor 25 rests upon bearings (preferably a first bearing 53 and a second bearing 55) that aid the rotor 25 in rotating around the stator 27. The rotor 25 may include magnets which allow the stator 27 to rotate the rotor 25, or the rotor 25 may be affixed to a secondary sleeve or ring that contains magnets that the stator 27 rotates. The rotor 25 may be formed out of a monolithic single piece of material, or it may be formed of several smaller components affixed together. The rotor 25 is preferably formed out of a ceramic, polymer, carbon fiber, or metal material, and is preferentially formed out of a metal with a high heat conductivity like copper or aluminum.

Optionally, the rotor 25 may take the form of a tire rim 57 that supports a wheel 21 or inflatable tire. The tire rim 57 may be formed out of the same unitary monolithic piece of material as the rotor, or the tire rim 57 may be formed by subcomponent parts that are affixed to the rotor 25 to form the edges and lips of the tire rim 57.

The stator 27 is located within the rotor 25. When powered, the stator 27 spins the rotor 25 to rotate the wheel 21 attached to the rotor 25, thereby propelling the vehicle 1. The movement of the stator 27 is controlled by the electronic controller 47.

The stator 27 is arranged such that it encompasses the hollow center cavity 59 that contains the inner sleeve 31 that may in turn contain part or all of the mounting board 45 of the electronic controller 47. The stator 27 may be attached to the inner sleeve 31 via a friction press fit connection, or by fasteners including (but not limited to) bolts, screws, or adhesives. The inner sleeve 31 may take the form of a cylinder, and may be formed out of a single monolithic piece of material or out of several components. The inner sleeve 31 may be formed out of a ceramic, polymer, carbon fiber, or metal material, and is preferentially formed from a material that has a low heat conductivity. However, if the inner sleeve 31 material is a material with a relatively high heat conductivity, thermally reflective material or thermally insulating material may optionally be added to the inner sleeve 31 to reduce heat transfer into the inner sleeve's interior chamber 39. Examples of a thermally reflective material coating include but are not limited to: reflective paints, reflective coatings, and reflective foil. Examples of an insulating material include but are not limited to: fiberglass, mineral wool, cellulose, foam, rubber, thermoplastics, ceramic, acrylic coatings, and polymers.

The power wire 49 may connect the electronic controller 47 to the vehicle's power supply (for example, a battery). The power wire 49 may enter the interior chamber 39 through a port on one of the end caps 41, 43. The power wire 49 may attach to the electronic controller 47 via releasable connectors 99 that allow users to more easily detach the electronic controller 47 for maintenance or repair.

A control wire 51 may be included to connect the electronic controller 47 to the stator 27. The controller 47 may control the motor 3 by controlling power to the stator 27. The control wire 51 may pass out of the interior chamber 39 into the stator 27 via an access hole in the inner sleeve 31 wall. The control wire 51 may attach to the electronic controller 47 and/or stator 27 via releasable connectors 99 that allow users to more easily remove the electronic controller 47 for maintenance or repair.

With specific reference to FIG. 8, in an embodiment of the apparatus the rotor 25, the stator 27, and the inner sleeve 31 all have respective lengths. The length of the stator 27 may be shorter than the length of either the rotor 25 or the length of the inner sleeve 31. Bearings may sit in line with the stator's 27 length while being located between the rotor 25 and the inner sleeve 31. In one embodiment of the apparatus, the hub motor 3 contains a first bearing 53 and a second bearing 55 that sit in line with the stator 27 and lie between the inner sleeve 31 and the rotor 25.

With reference to FIGS. 10-13, the inner sleeve 31 forms an interior which forms the interior chamber 39. The inner sleeve 31 has a first end 61, a second end 63, and connecting body 65 between the first end 61 and the second end 63. Preferably, both ends 61, 63 of the inner sleeve 31 contain an opening 67 that opens into interior chamber 39. However, in some embodiments of the apparatus, one end of the inner sleeve 31 is sealed shut permanently with no opening into the interior chamber 39. The body 65 of the inner sleeve 31 may optionally contain one or more access holes 69 for wires to run between the stator 27 and the interior chamber 39 of the inner sleeve 31. The first end 61 of the inner sleeve 31 and second end 63 of the inner sleeve 31 may contain openings 67 into the interior chamber 39.

In one embodiment of the apparatus, one end of the inner sleeve 31 is sealed permanently closed, and the other end of the inner sleeve 31 has an opening 67 into the interior chamber 39. In such an embodiment, the sealed shut end of the sleeve may correspond to one of the end caps 41, 43. The other end cap 41, 43 is affixed to the open end of the inner sleeve 31 while the sealed end of the inner sleeve 31 may be attached to or is integral with frame mounts 23. In this single-opening embodiment, the mounting board 45 may attach to the sealed end of the inner sleeve 31, or, alternatively, the mounting board 45 may be supported via a cantilever from the end cap 41, 43 covering the open end of the inner sleeve 31.

With respect to FIGS. 8, 14-17, and 19, the openings 67 in the ends of the inner sleeve 31 are covered by a respective first end cap 41 and a respective second end cap 43 (collectively referred to as "the end caps"). Each end cap 41, 43 is designed to seal the interior chamber 39 to keep dust, water, or debris out of the interior chamber 39. If both ends 61, 63 of the inner sleeve have openings 67, then a first end cap 41 may be used to seal the first end 61 of the inner sleeve and a second end cap is used to seal the second end 63 of the inner sleeve 31.

The first end cap 41 or second end cap 43 may be attached to the first end 61 and second end 63 of the inner sleeve 31 via a friction fit, snap locks, adhesives, threads, bolts, screws, magnets or other means of attachment. In a preferred embodiment, the end caps 41, 43 contain end cap bolt holes 71 and the inner sleeve 31 contains threaded bolt-receiving threads 73. An end cap bolt 75 or screw is then inserted through the end cap bolt holes 71 to bolt the respective end cap 41, 43 into the bolt-receiving threads 73 on each end 61, 63 of the inner sleeve 31.

Optionally, one or both of the first end cap 41 and second end cap 43 may contain charging ports 77, control buttons 79, control panels, or displays. The charging ports 77 may connect to the electronic controller 47 to aid in programing the controller 47, or may connect to a battery 19 to charge the electric vehicle 1. The display, control panel, or control buttons may be used to send signals to the electronic controller 47 to turn on the vehicle 1, control the vehicle 1, or adjust settings programmed into the electronic controller 47.

The end cap may include an interior side 81 that faces the interior chamber 39 and an exterior side 83 that faces away from the interior chamber 39 when the end cap 41, 43 is attached to the inner sleeve. The interior side 81 of the end cap 41, 43 may optionally be shaped to form an end cap cavity 85 to embed circuitry or wires into the end cap 41, 43. The exterior side 83 of the end cap 41, 43 may contain one or more frame mounts 23.

Figure 15:
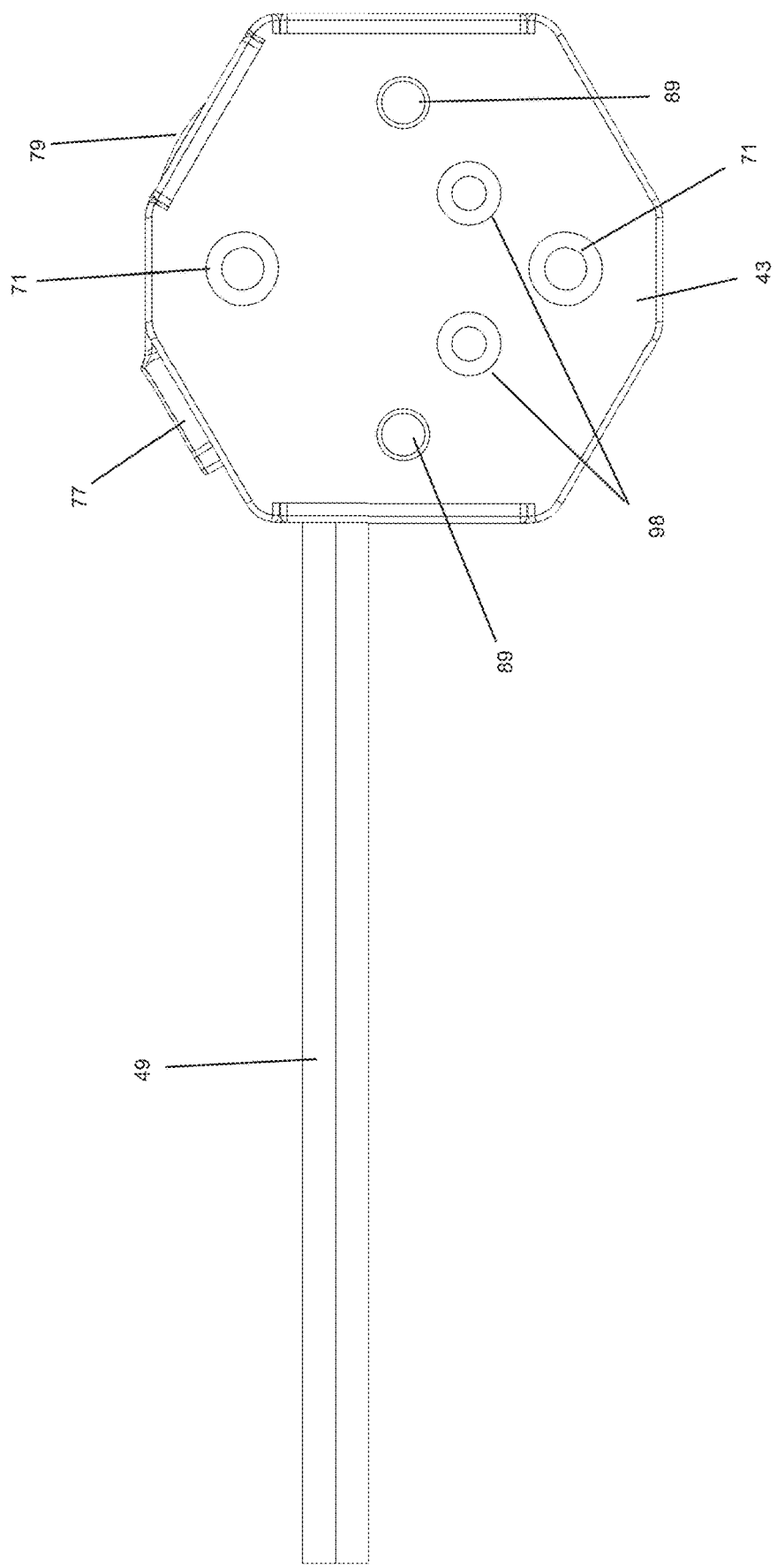
FIG. 15 is a right-side view of the first end cap, showing its exterior facing side in one embodiment of the disclosed motor.
Figure 16:
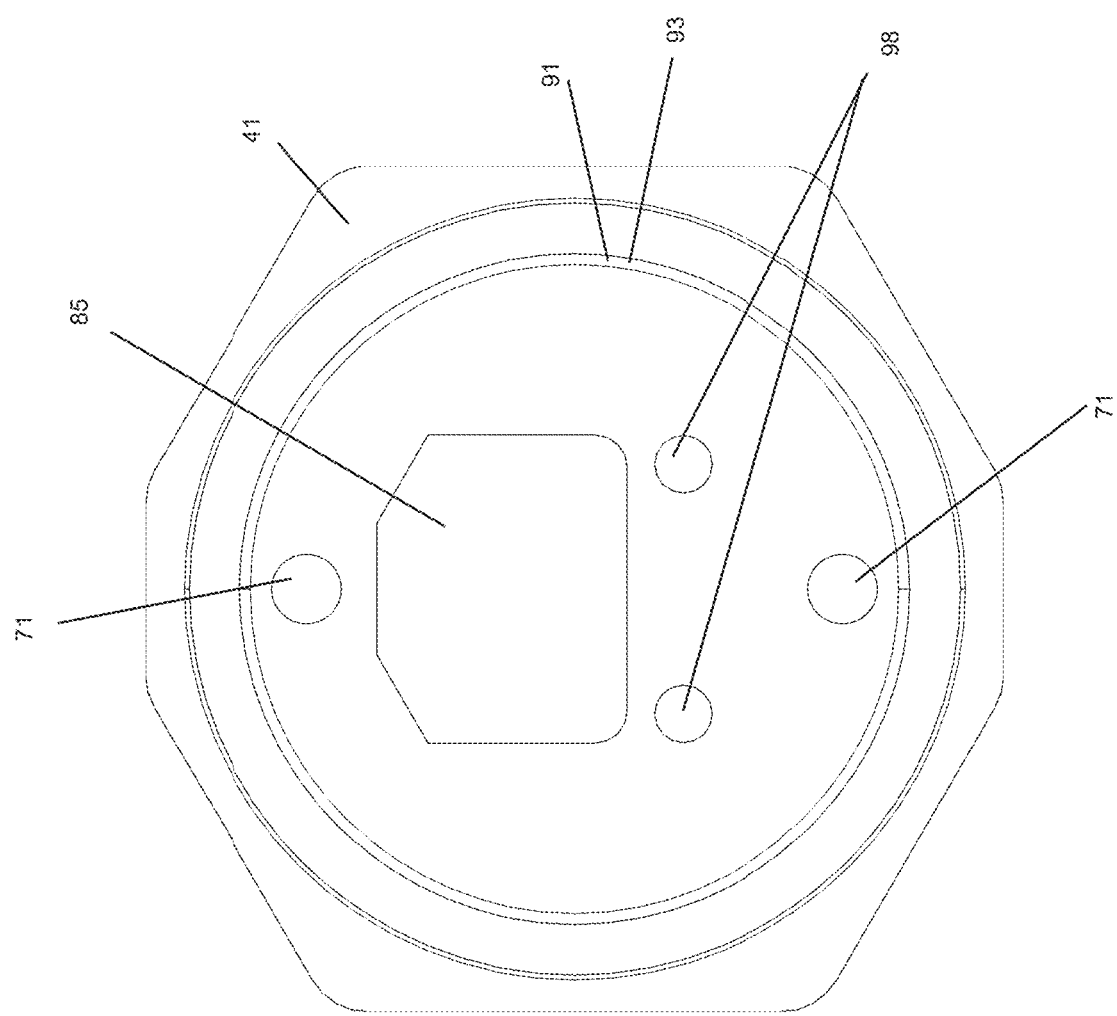
FIG. 16 is a right-side view of a second end cap showing the interior chamber facing side of the end cap in one embodiment of the disclosed motor.
Figure 17:
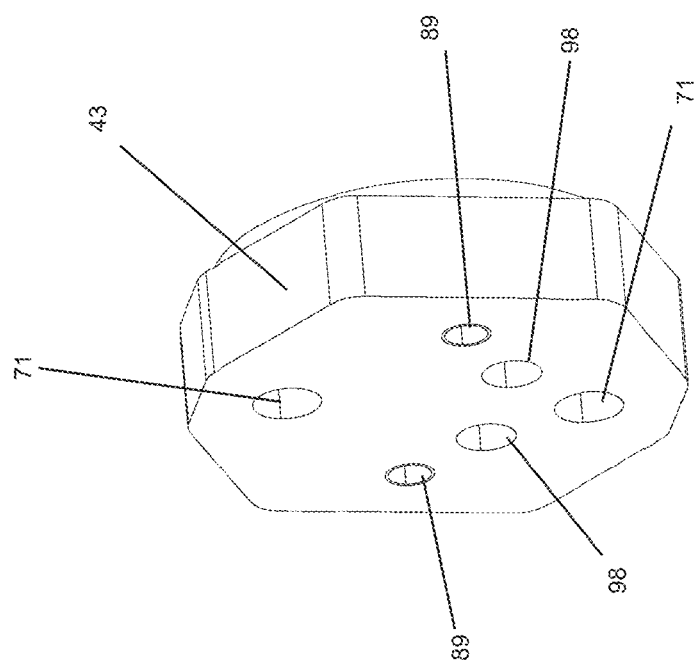
FIG. 17 is a left-side elevational view of a second end cap in one embodiment of the disclosed motor.
Figure 18:
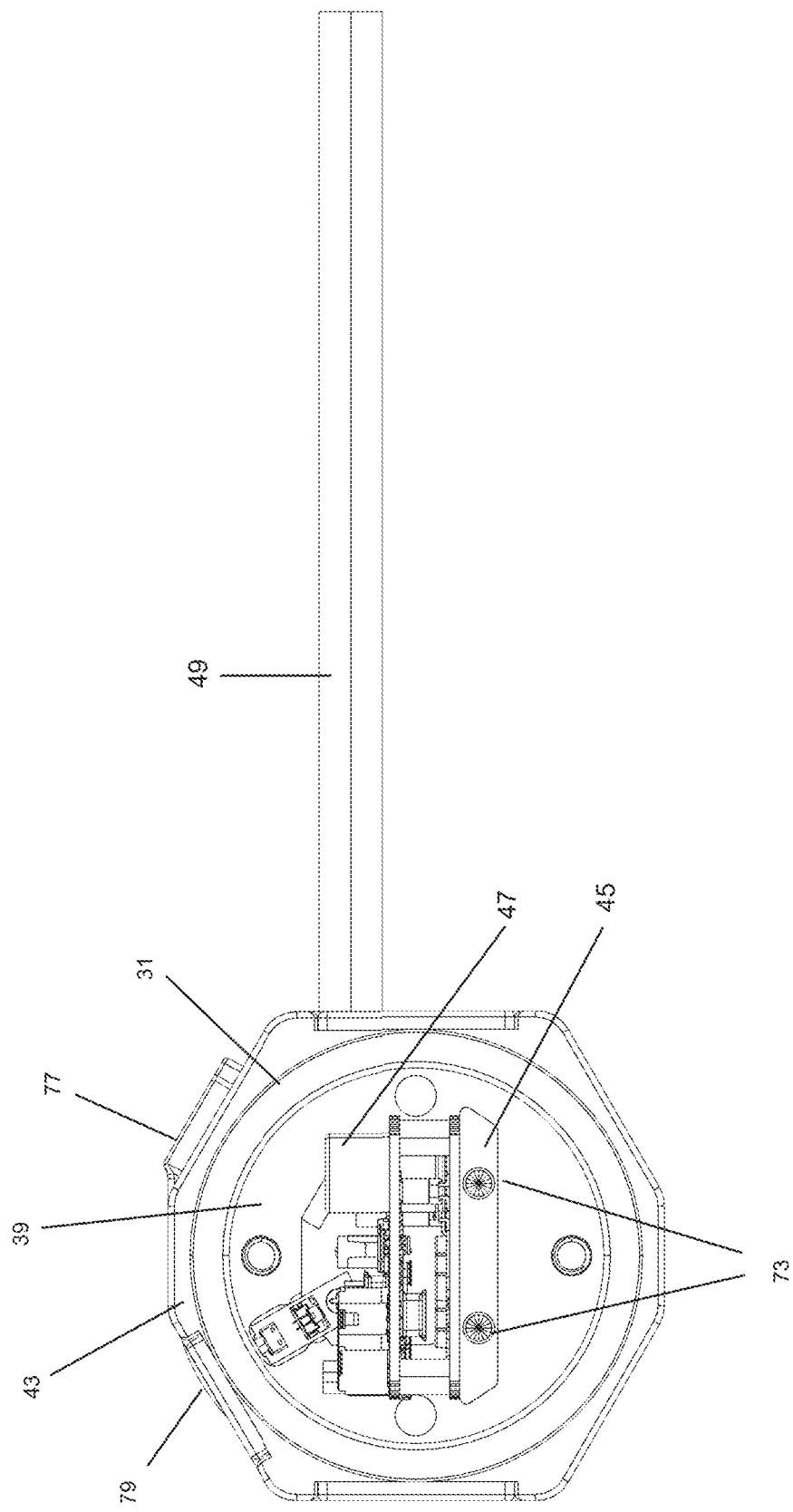
FIG. 18 is a left-side view showing the electronic controller attached to the mounting board, which is in turn attached to the first end cap of the disclosed motor.
Figure 19:
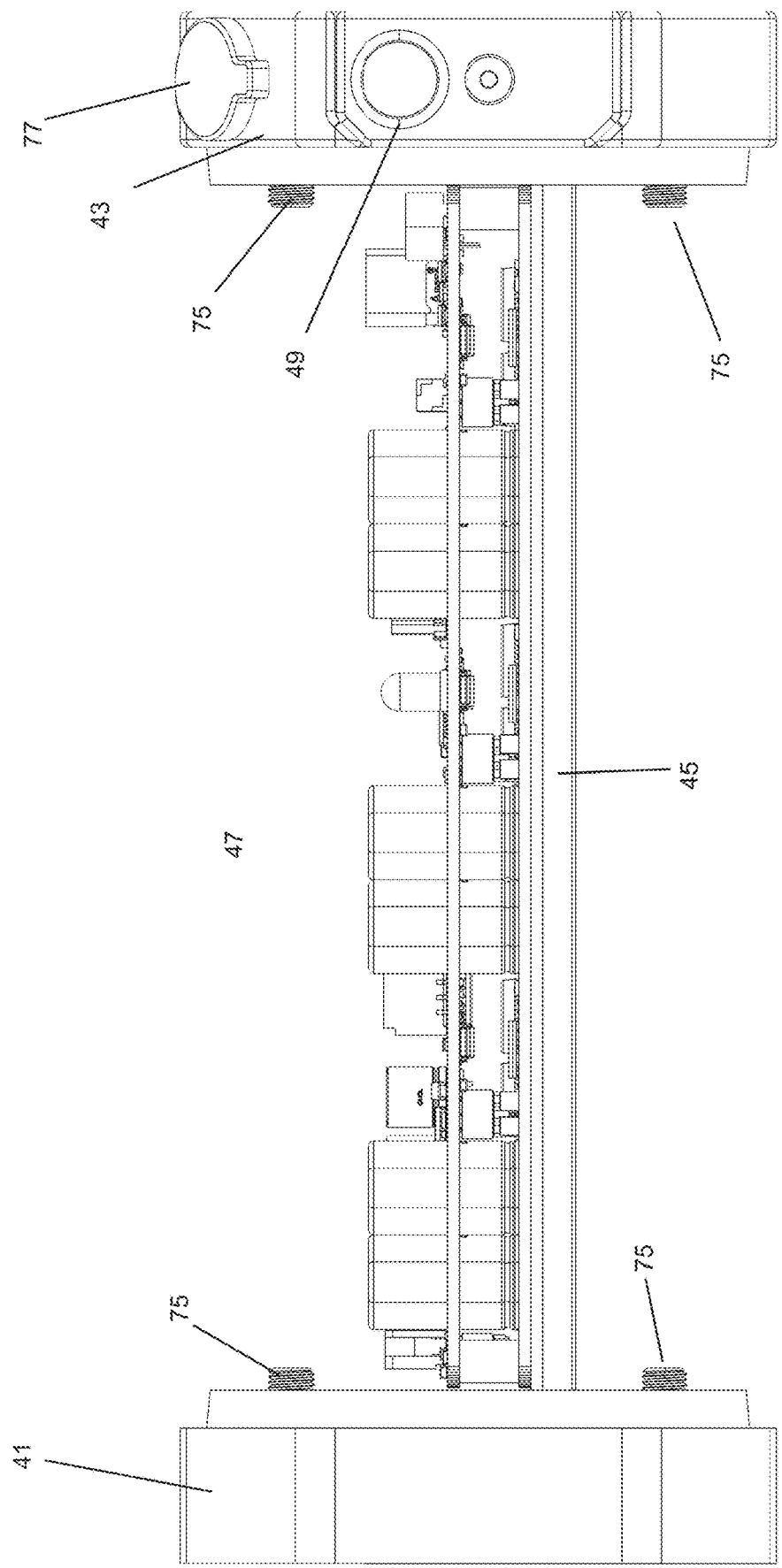
FIG. 19 is a front-side view showing how the mounting board, electronic controller and end caps fit together in one embodiment of the disclosed motor.
Figure 20:
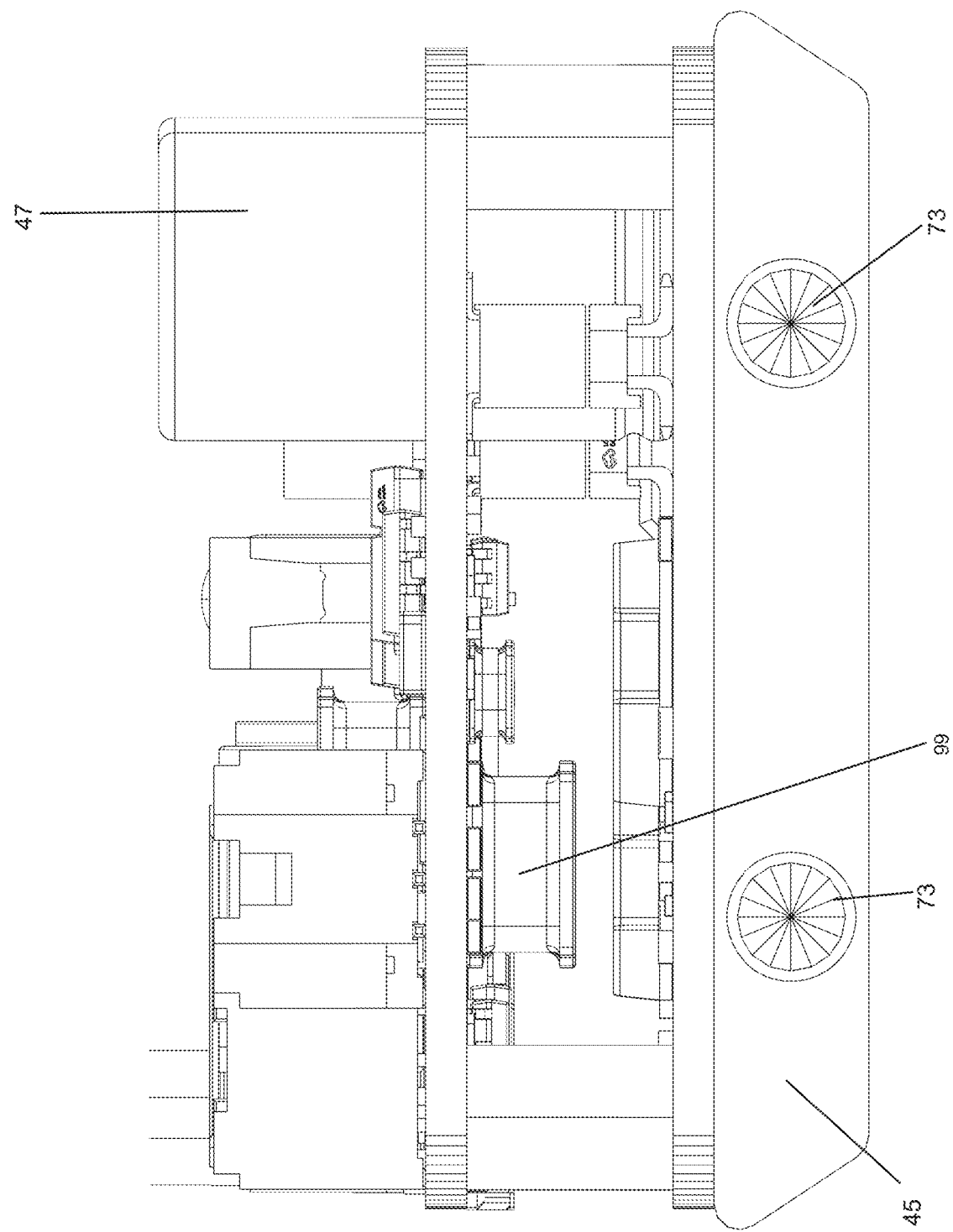
FIG. 20 is a left-side view showing the electronic controller attached to the mounting board in one embodiment of the disclosed motor.
Figure 21:
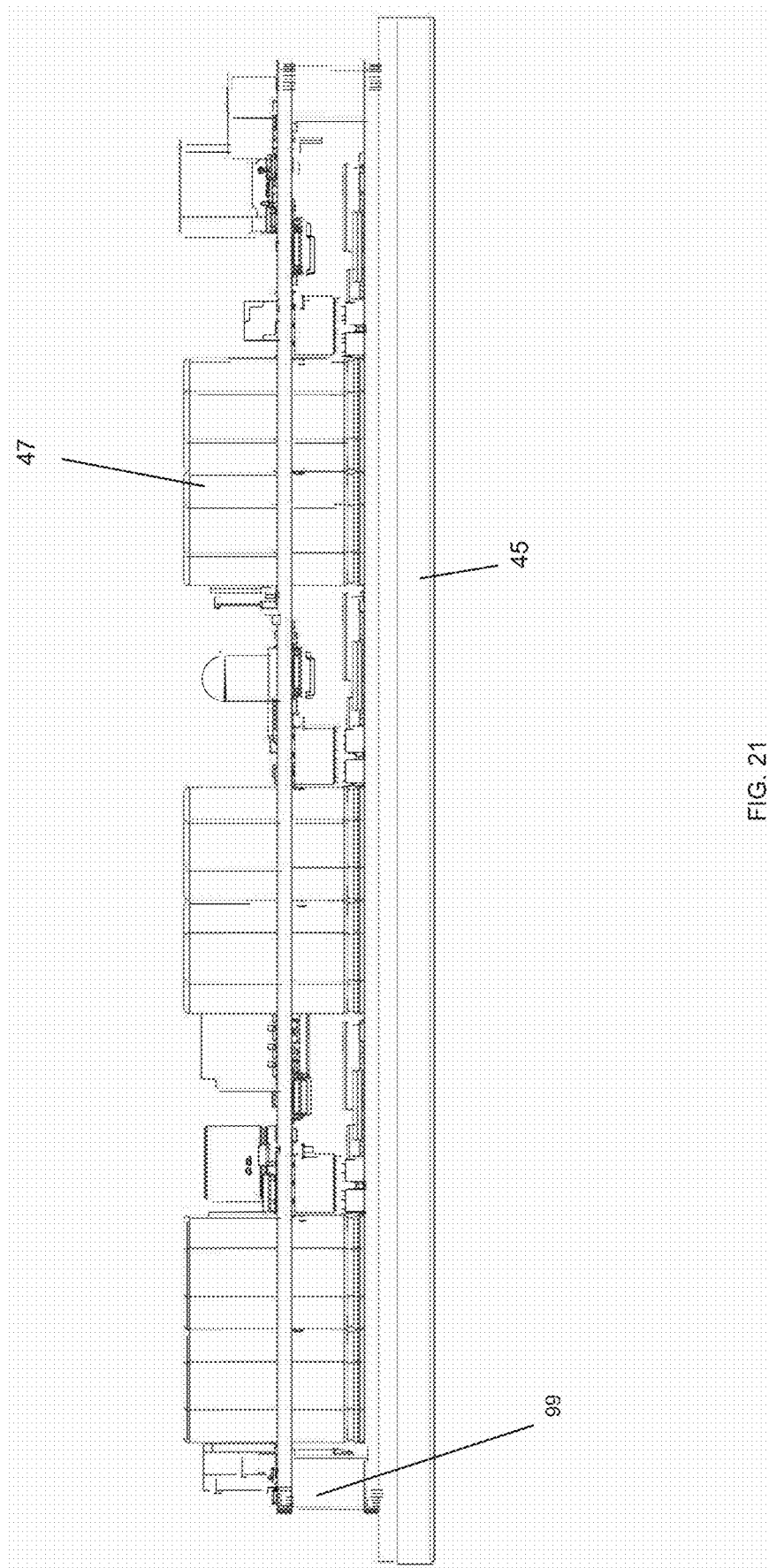
FIG. 21 is a front-side view showing the electronic controller attached to the mounting board.

With regard to FIGS. 1, 15, and 17, the frame mounts 23 are configured to attach to a frame or chassis 7 of the vehicle 1. Preferably, the frame mounts 23 take the form of frame mount bolts and frame mount threaded holes 89 that allow both end caps to attach to the vehicle frame 5 or chassis 7. Optionally, the exterior sides 83 of the end caps 41, 43 may be formed out of a heat conductive material and may include a heat sink affixed to or integral with the end cap 41, 43. In embodiments of the apparatus that only have an opening 67 in one of the two ends of the inner sleeve 31 the opposite end without an opening 67 may have a frame mount 23 attached directly to the inner sleeve 31.

The first end cap 41 and second end cap 43 may include a groove 91 configured to hold a seal 93 that will seal against the inner sleeve 31 when the end caps 41, 43 attach to the inner sleeve 31. In a preferred embodiment of the apparatus, this seal is watertight and the interior chamber 39 is watertight.

In an alternative embodiment, the frame mounts 23 may take the form of axle hub shaft protrusions that attach to the vehicle chassis 7 so that the inner sleeve 31 may serve as an axle.

With respect to FIGS. 18-21, the mounting board 45 may be suspended within the interior chamber 39, and the electronic controller 47 may be mounted to the mounting board 45. Because the electronic controller 47 can be damaged by the heat produced by the stator 27, it is preferable for apparatus to decrease the temperature in the interior chamber 39. Accordingly, it is preferable to position the mounting board 45 so as to not contact any portion of the inner sleeve 31. In one embodiment of the apparatus, the mounting board 45 may be solely structurally supported by the first end cap 41, the second end cap 43, and any mounting board fasteners 75 that attach the mounting board 45 to the end caps 41, 43.

Alternatively, the mounting board 45 may be positioned to contact the entire inner sleeve 31, or only a relatively small percentage of the inner sleeve 31. In some embodiments of the current invention, this relatively small percentage is contact with less than 50% of the inner sleeve's inner surface 32. In another embodiment the mounting board 45 contacts between 30-40% of the inner sleeve's inner surface 32. In another embodiment the mounting board 45 contacts between 20 and 30% of the inner sleeve's inner surface 32. In yet another embodiment, the mounting board 45 contacts between 10 and 20% of the inner sleeve inner surface 32. In another embodiment, the mounting board 45 contacts 10 and 5% of the inner sleeve inner surface 32 In a more preferred embodiment, the mounting board 45 contacts less than 5% of the inner sleeve's inner surface 32. Optionally, the contact between the mounting board and the inner sleeve may be formed out of a thermally insulative material.

Optionally, the mounting board 45 contacts the inner sleeve 21 at the first end 61 or second end 63 of the inner sleeve, or is closer to the first end 62 and second end 63 of the inner sleeve than a middle section of the inner sleeve 31.

Metal, ceramic, polymer, wood, carbon fiber, or fiberglass may be used to form the mounting board. However, it is preferable that the mounting board 45 is formed out of a heat conductive material to transfer heat away from the electronic controller 7 to the end caps 41, 43 for emission outside of the interior chamber 39. The mounting board 45 may take the form of any shape that supports an electronic controller 47 so that they do not contact the inner sleeve. However, it is preferable that the mounting board 45 take the form of a straight plane.

The mounting board 45 may be formed as a separate component from the first end cap 41 or second end cap 43. Alternatively, the mounting board 45 may be formed as a single continuous monolithic extension of an end cap 41, 43. If the mounting board 45 is a separate component from the end cap, then the mounting board 45 may be permanently or removably attached to one or both end caps 41, 43. Fasteners 75, with fastener receiving holes 97, end cap mounting board holes 98, adhesives, welded joints, and magnets are all non-limiting examples of ways the mounting board 45 may be attached to a hub motor end cap 41, 43.

The end caps 41, 43 of the apparatus may be removeable, allowing users of the vehicle 1 to easily access any electronic controller 47 or battery contained inside the interior chamber 39. The end caps 41, 43 may be large enough to cover the width or diameter of the inner sleeve 31, or of the hollow center cavity 59 of the stator 27.

The electronic controller 47 may be mounted, either removably or permanently, to the mounting board 45. The electronic controller 47 may include a processor that is configured to receive inputs from sensors 15 on the electronic vehicle and output directions to run the stator 27, thereby driving the motor 3 and the corresponding vehicle 1.

In an embodiment of the apparatus, the current application's electric vehicle 1 contains a hub motor 3 that does not contain an inner sleeve 31. In this embodiment the electronic controller 47 of the electric vehicle 1 is inserted directly into the hollow center cavity 59 formed by the stator 27. The hollow center cavity 51 has a first cavity end and a second cavity end, and the first end cap 41 and the second end cap 43 cover the first cavity end and the second cavity end. The end caps may attach directly to the stator 27, may attach to the rotor 25, or may attach to the chassis 7. The electronic controller 47 or battery 19 is contained within the hollow center cavity 59, and the mounting board 45 may optionally be used to suspend the electronic controller 47 or battery 19 away from the of the stator 27.

Although the disclosure has been shown and described with respect to a certain embodiment or embodiments, equivalent alterations and modifications will occur to others skilled in the art upon reading and understanding of this specification and the annexed drawings. In particular regard to the various functions performed by the above described elements (components, assemblies, devices, compositions, etc.), the terms (including any reference to a "means") used to describe such elements are intended to correspond, unless otherwise indicated, to any element which performs the specified function of the described element (i.e. that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

The invention claimed is:

1. An electric vehicle comprising:
   a board frame including a chassis, a first deck portion, and a second deck portion, wherein the chassis supports the first deck portion and the second deck portion, each of the deck portions configured to receive a left or right foot of a rider oriented generally perpendicular to a direction of travel of the electric vehicle;
   a rotatable ground-contacting wheel disposed between and extending above the first deck portion and the second deck portion;
   a hub motor configured to rotate the ground-contacting wheel to propel the electric vehicle, the hub motor including:
      a rotor;
      a stator disposed within the rotor, the stator having formed therein a center cavity;
   an electronic controller contained within the center cavity, wherein the electronic controller is configured to operate the hub motor by controlling power to the stator;
   wherein the ground-contacting wheel encircles the rotor and wherein the chassis connects to the hub motor frame mounts;
   an inner sleeve that is located inside the center cavity, wherein the inner sleeve has a body, a first end, and a second end, wherein the inner sleeve forms an interior chamber within which the electronic controller resides;
   at least one of a first end cap that is attached to the first end of the inner sleeve and a second end cap that is attached to the second end of the inner sleeve, and
   a mounting board that is located within the interior chamber, wherein the mounting board connects to at least one of the first end cap or the second end cap.

2. The electric vehicle of claim 1, further including:
   a power wire configured to power the electronic controller or stator;
   a signal wire configured to communicate signals between one or more sensors and the electronic controller; and
   a control wire configured to send power from the electronic controller to the stator;
   wherein the electronic controller is attached to the mounting board.

3. The electric vehicle of claim 2, wherein the mounting board is solely suspended and supported from the first end cap and the second end cap, and the mounting board contacts less than 50% of an inner surface of the inner sleeve.

4. The electric vehicle of claim 2, wherein the inner sleeve body has an access hole, and wherein the control wire passes through the access hole.

5. The electric vehicle of claim 2, wherein the electronic controller connects to the power wire and the control wire via releasable connectors.

6. The electric vehicle of claim 1, wherein the inner sleeve has an interior surface that includes a thermally insulating material.

7. The electric vehicle of claim 1, further comprising a heat sink affixed or integral to the first or second end caps.

8. The electric vehicle of claim 1, wherein the first end cap and the second end cap each include a seal; and
   wherein the first end cap is engaged to the first end of the inner sleeve, and second end cap is engaged to the second end of the inner sleeve to make the interior chamber watertight.

9. The electric vehicle of claim 1, wherein the stator and the inner sleeve are connected via a friction fit.

10. The electric vehicle of claim 1, wherein the first end cap and the second end cap sit flush with the chassis, the first end cap and the second end cap bolt directly to the chassis, and no air gaps exist between the chassis and the first end cap, and no air gaps exist between the chassis and the second end cap.

11. The electric vehicle of claim 1, wherein the rotor, the inner sleeve, and the stator each have respective lengths, and wherein the lengths of both the rotor and the inner sleeve are greater than the length of the stator.

12. The electric vehicle of claim 11,
   wherein the stator has a first end and a second end;
   wherein a first bearing is in line with a first end of the stator, and a second bearing is in line with a second end of the stator; and
   wherein both the first bearing and the second bearing are located between the inner sleeve and the rotor.

13. The electric vehicle of claim 1, wherein an axle extends from the first or second end cap and connects with the chassis.

14. The electric vehicle of claim 1, wherein the hub motor frame mounts are bolts that thread into threaded holes in the first end cap and the second end cap.

15. The electric vehicle of claim 1, wherein the vehicle includes both the electronic controller and a battery, and wherein the first end cap or second end cap contains a charging port connected to the battery, and wherein the first end cap or the second end cap contains a control interface configured to turn on the electronic controller.

16. The electric vehicle of claim 1,
   wherein the first end cap includes a respective one of the hub motor frame mounts.

17. An electric vehicle comprising:
   a board frame including a chassis, a first deck portion, and a second deck portion, wherein the chassis supports the first deck portion and the second deck portion, with each of the deck portions configured to receive a left or right foot of a rider oriented generally perpendicular to a direction of travel of the electric vehicle;
   a rotatable ground-contacting wheel disposed between and extending above the first deck portion and the second deck portion;
   a hub motor configured to rotate the ground-contacting wheel to propel the electric vehicle, the hub motor including:
      a rotor;
      a stator disposed within the rotor, the stator having formed a hollow center cavity with a first cavity end and a second cavity end;
      a first end cap that covers the first cavity end, and a second end cap that covers the second cavity end, wherein the first end cap and the second end cap include respective hub motor frame mounts;
   an electronic controller contained within the hollow center cavity, wherein the electronic controller is configured to operate the hub motor by controlling power to the stator;
   wherein the ground-contacting wheel encircles the rotor and wherein the chassis connects to the hub motor frame mounts.

18. The electric vehicle of claim 17, further including:
   a mounting board located within the hollow center cavity, wherein the mounting board connects to at least one of the first end cap or second end cap;

a power wire configured to power the electronic controller or stator;

a signal wire configured to communicate signals between the electronic controller and a sensor; and a control wire configured to send power from the electronic controller to the stator;

wherein the electronic controller is attached to the mounting board.

19. A hub motor comprising:

a rotor that surrounds a stator, the stator having formed a hollow center cavity with a first cavity end and a second cavity end;

an electronic controller contained within the hollow center cavity, wherein the electronic controller is configured to operate the hub motor by sending power to the stator;

an inner sleeve that is located inside the hollow center cavity, wherein the inner sleeve has a body, a first end, and a second end, wherein the inner sleeve forms an interior chamber within which the electronic controller resides;

at least one of a first end cap that is attached to the first end of the inner sleeve and a second end cap that is attached to the second end of the inner sleeve, and a mounting board that is located within the interior chamber, wherein the mounting board connects to at least one of the first end cap or the second end cap.

20. The hub motor of claim 19, further comprising:

wherein the first end is a first open end, and the second end is a second closed end.

21. The hub motor of claim 20, wherein the mounting board connects to at least one of the first end cap or the second closed end of the inner sleeve; and a control wire configured to send power from the electronic controller to the stator;

wherein the electronic controller is attached to the mounting board.

22. The hub motor of claim 19, further comprising:

wherein the first end cap and the second end cap each includes a respective frame mount.

23. The hub motor of claim 22, further comprising:

a control wire configured to send power from the electronic controller to the stator, wherein the electronic controller is attached to the mounting board.

24. The hub motor of claim 22, wherein the mounting board contacts less than 50% of an inner surface of the inner sleeve.

25. The hub motor of claim 22, wherein a surface of the inner sleeve is covered with a thermally insulative material.

26. The hub motor of claim 22, wherein one of the first or second end caps contains a control interface configured to turn on the electronic controller.

27. The hub motor of claim 22, wherein one of the first or second end cap contains a charging port.

28. The hub motor of claim 22, wherein one of the first or second end caps contains an electrical receptacle configured to receive a releasable power wire.

29. The hub motor of claim 22, further comprising a watertight seal located between one of the first or second end caps and the inner sleeve.

30. The hub motor of claim 19, wherein the first end cap is attached to and covers the first open end of the inner sleeve, wherein the first end cap includes a frame mount.

* * * * *